United States Patent
LaConti et al.

(10) Patent No.: US 7,261,967 B2
(45) Date of Patent: *Aug. 28, 2007

(54) PROTON EXCHANGE MEMBRANE (PEM) ELECTROCHEMICAL CELL HAVING AN INTEGRAL, ELECTRICALLY-CONDUCTIVE, RESILIENTLY COMPRESSIBLE, POROUS PAD

(75) Inventors: Anthony B. LaConti, Lynnfield, MA (US); William A. Titterington, River Ranch, FL (US); Larry L. Swette, Henderson, NV (US); Ricardo Leon, Worcester, MA (US); Kwang S. Kim, Andover, MA (US)

(73) Assignee: Giner Electrochemical Systems, LLC, Newton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/351,562

(22) Filed: Feb. 10, 2006

(65) Prior Publication Data

US 2006/0131166 A1  Jun. 22, 2006

Related U.S. Application Data

(63) Continuation of application No. 10/335,126, filed on Dec. 30, 2002, which is a continuation-in-part of application No. 09/827,368, filed on Apr. 5, 2001, now Pat. No. 6,500,319.

(51) Int. Cl.
  *H01M 2/14* (2006.01)
(52) U.S. Cl. .............................. 429/38; 429/34; 429/39; 429/35

(58) Field of Classification Search .................. 429/34, 429/35, 38, 39
See application file for complete search history.

(56) References Cited

U.S. PATENT DOCUMENTS

| | | | | |
|---|---|---|---|---|
| 4,894,299 A | * | 1/1990 | Morse | ......................... 429/104 |
| 6,500,319 B2 | * | 12/2002 | LaConti et al. | ............. 204/263 |
| 6,852,441 B2 | * | 2/2005 | Milgate et al. | ............... 429/39 |
| 2004/0016638 A1 | * | 1/2004 | LaConti et al. | ............. 204/252 |

* cited by examiner

*Primary Examiner*—Bruce F. Bell
(74) *Attorney, Agent, or Firm*—Kriegsman & Kriegsman

(57) ABSTRACT

Electrolysis cell comprises, in one embodiment, a proton exchange membrane (PEM), an anode positioned along one face of the PEM, and a cathode positioned along the other face of the PEM. A multi-layer metal screen for defining a first fluid cavity is placed in contact with the outer face of the anode, and an electrically-conductive, compressible, spring-like, porous pad for defining a second fluid cavity is placed in contact with the outer face of the cathode. The porous pad comprises a mat of carbon fibers bound together with one or more, preferably thermoplastic, resins, the mat having a density of about 0.2-1.5 g/cm$^3$. Cell frames are placed in peripheral contact with the metal screen and the compression pad for peripherally containing fluids present therewithin. Electrically-conductive separators are placed in contact with the metal screen and the compression pad for axially containing fluids present therewithin. A plurality of the cells may be arranged in series in a bipolar configuration without requiring a separate compression pad between cells (for gas pressure differentials up to about 400 psi or greater). The invention is also directed to a fuel cell wherein the pad replaces the carbon fiber paper or carbon fiber cloth in contact with the cathode or anode.

20 Claims, 19 Drawing Sheets

Diameter = 3.29"  Area = 8.5 in2  Carbon Thickness ~ 0.132"  Density ~ 0.55g/ml

10% Compression = 0.119"

| psi | Pounds | Deflection (Lead) | | | | Ave. Thk. | % Deflection | Free Height (Carbon) | | | | Rebound | 0.55-Defl | Net Defl | Deformation |
| --- | --- | --- | --- | --- | --- | --- | --- | --- | --- | --- | --- | --- | --- | --- | --- |
| | | 1 | 2 | 3 | 4 | | | 1 | 2 | 3 | 4 | | | | |
| 0 | 0 | | | | | 0.132 | 0.0% | 0.1313 | 0.1307 | 0.1304 | 0.1300 | 0.132 | 0.00 | 0.00 | 0.00 |
| 100 | 850 | 0.1304 | 0.1280 | 0.1274 | 0.1295 | 0.129 | 2.4% | 0.1307 | 0.1302 | 0.1298 | 0.1294 | 0.1306 | 3.18 | 1.78 | 1.40 |
| 200 | 1700 | 0.1282 | 0.1230 | 0.1222 | 0.1249 | 0.124 | 6.0% | 0.1304 | 0.1298 | 0.1293 | 0.1288 | 0.1300 | 7.93 | 5.90 | 2.03 |
| 300 | 2550 | 0.1218 | 0.1181 | 0.1170 | 0.1200 | 0.119 | 9.7% | 0.1291 | 0.1284 | 0.1277 | 0.1278 | 0.1295 | 12.78 | 10.25 | 2.53 |
| 400 | 3400 | 0.1136 | 0.1097 | 0.1087 | 0.1118 | 0.111 | 15.9% | 0.1291 | 0.1284 | 0.1277 | 0.1278 | 0.1283 | 21.05 | 17.30 | 3.75 |

Fig. 11

Density - 0.8g/ml
Diameter - 3.3"   Area = 8.55 in2   Carbon Thickness = 0.1357"
10% Compression = 0.1224"

| | | Nom. "0.60" g/cc Porous Carbon | | | |
|---|---|---|---|---|---|
| Thickness(in) | Area(in²) | Volume(cc) | Weight(g) | density(g/cc) | |
| 0.1357 | 8.55 | 19.01 | 12.38 | 0.65 | |

| psi | Pounds | Deflection (Lead) | | | | Ave.Thk. | % Deflection | Free Height (Carbon) | | | | Rebound | 0.65-Defl | Net Defl | Deformation |
|---|---|---|---|---|---|---|---|---|---|---|---|---|---|---|---|
| | | 1 | 2 | 3 | 4 | | | 1 | 2 | 3 | 4 | | | | |
| 0 | 0 | 0.1357 | 0.1357 | 0.1357 | 0.1357 | 0.1357 | 0.0% | 0.1357 | 0.1357 | 0.1357 | 0.1357 | 0.1357 | 0.00 | 0.00 | 0.00 |
| 100 | 855 | 0.1353 | 0.1343 | 0.1345 | 0.1349 | 0.1351 | 0.5% | 0.1357 | 0.1356 | 0.1359 | 0.1357 | 0.1357 | 0.67 | 0.67 | 0.00 |
| 200 | 1710 | 0.1348 | 0.1333 | 0.1338 | 0.1345 | 0.1343 | 1.0% | 0.1356 | 0.1355 | 0.1357 | 0.1356 | 0.1356 | 1.40 | 1.30 | 0.10 |
| 300 | 2565 | 0.1340 | 0.1327 | 0.1332 | 0.1338 | 0.1338 | 1.5% | 0.1356 | 0.1354 | 0.1356 | 0.1356 | 0.1356 | 1.98 | 1.80 | 0.17 |
| 400 | 3420 | 0.1334 | 0.1321 | 0.1324 | 0.1335 | 0.1330 | 2.0% | 0.1356 | 0.1354 | 0.1355 | 0.1355 | 0.1355 | 2.72 | 2.50 | 0.22 |
| 500 | 4275 | 0.1325 | 0.1315 | 0.1318 | 0.1328 | 0.1323 | 2.5% | 0.1355 | 0.1353 | 0.1354 | 0.1354 | 0.1354 | 3.40 | 3.10 | 0.30 |
| 600 | 5130 | 0.1319 | 0.1305 | 0.1308 | 0.1317 | 0.1313 | 3.2% | 0.1355 | 0.1352 | 0.1352 | 0.1353 | 0.1353 | 4.40 | 3.98 | 0.42 |
| 700 | 5985 | 0.1307 | 0.1291 | 0.1292 | 0.1312 | 0.1304 | 4.0% | 0.1353 | 0.1350 | 0.1351 | 0.1351 | 0.1352 | 5.37 | 4.83 | 0.55 |
| 800 | 6840 | 0.1291 | 0.1279 | 0.1281 | 0.1299 | 0.1292 | 4.8% | 0.1351 | 0.1348 | 0.1348 | 0.1350 | 0.1350 | 6.57 | 5.83 | 0.75 |
| 900 | 7700 | 0.1275 | 0.1268 | 0.1270 | 0.1285 | 0.1279 | 5.8% | 0.1347 | 0.1344 | 0.1344 | 0.1346 | 0.1348 | 7.87 | 6.77 | 1.10 |
| 1000 | 8550 | 0.1255 | 0.1248 | 0.1257 | 0.1273 | 0.1263 | 6.9% | 0.1339 | 0.1339 | 0.1339 | 0.1343 | 0.1342 | 9.40 | 7.87 | 1.53 |
| 1100 | 9405 | 0.1219 | 0.1226 | 0.1232 | 0.1252 | 0.1241 | 8.5% | 0.1330 | 0.1336 | 0.1331 | 0.1336 | 0.1334 | 11.60 | 9.23 | 2.37 |
| 1200 | 10260 | 0.1219 | 0.1196 | 0.1220 | 0.1239 | 0.1216 | 10.4% | 0.1324 | 0.1320 | 0.1327 | 0.1328 | 0.1326 | 14.13 | 11.03 | 3.10 |
| 1300 | 11115 | 0.1204 | 0.1165 | 0.1183 | 0.1214 | 0.1192 | 12.2% | 0.1324 | 0.1308 | 0.1312 | 0.1319 | 0.1318 | 16.58 | 12.43 | 4.15 |

Fig. 12

Density - 0.75g/ml    Area - 8.55 in2    Carbon Thickness ~ 0.135"       "0.75" g/cc Porous Carbon
Diameter - 3.3"                                                    | Thickness(in) | Area(in²) | Volume(cc) | Weight(g) | Density(g/cc) |
10% Compression = 0.1215"                                          | 0.135 | 8.55 | 18.91 | 14.61 | 0.77 |

| psi | Pounds | 1 | 2 | 3 | 4 | Ave. Thk. | % Deflection | 1 | 2 | 3 | 4 | Rebound | 0.77-Defl | Weight(g) | Net Defl | Deformation |
|---|---|---|---|---|---|---|---|---|---|---|---|---|---|---|---|---|
| 0 | 0 | | | | | 0.1350 | 0.0% | 0.1355 | 0.1346 | 0.1349 | 0.1350 | 0.1350 | 0.00 | | 0.00 | 0.00 |
| 100 | 855 | | | | | 0.1333 | | | | | | 0.1350 | 1.74 | | 1.74 | 0.00 |
| 200 | 1710 | 0.1328 | 0.1304 | 0.1306 | 0.1323 | 0.1315 | 2.6% | 0.1354 | 0.1344 | 0.1346 | 0.1345 | 0.1347 | 3.48 | | 3.20 | 0.28 |
| 300 | 2565 | 0.1328 | 0.1294 | 0.1302 | 0.1323 | 0.1312 | 2.8% | 0.1353 | 0.1343 | 0.1345 | 0.1345 | 0.1347 | 3.83 | | 3.48 | 0.35 |
| 400 | 3420 | 0.1322 | 0.1292 | 0.1290 | 0.1312 | 0.1304 | 3.4% | 0.1352 | 0.1339 | 0.1343 | 0.1345 | 0.1345 | 4.60 | | 4.08 | 0.52 |
| 500 | 4275 | 0.1310 | 0.1287 | 0.1283 | 0.1300 | 0.1295 | 4.1% | 0.1351 | 0.1339 | 0.1342 | 0.1344 | 0.1344 | 5.50 | | 4.90 | 0.60 |
| 600 | 5130 | 0.1302 | 0.1274 | 0.1274 | 0.1294 | 0.1286 | 4.7% | 0.1349 | 0.1339 | 0.1342 | 0.1344 | 0.1344 | 6.40 | | 5.75 | 0.65 |
| 700 | 5985 | 0.1294 | 0.1265 | 0.1267 | 0.1288 | 0.1278 | 5.3% | 0.1348 | 0.3338 | 0.1340 | 0.1342 | 0.1342 | 7.20 | | 6.40 | 0.80 |
| 800 | 6840 | 0.1288 | 0.1263 | 0.1259 | 0.1277 | 0.1271 | 5.8% | 0.1346 | 0.1337 | 0.1338 | 0.1342 | 0.1341 | 7.87 | | 6.95 | 0.93 |
| 900 | 7700 | 0.1278 | 0.1252 | 0.1254 | 0.1272 | 0.1264 | 6.4% | 0.1344 | 0.1337 | 0.1338 | 0.1341 | 0.1340 | 8.65 | | 7.70 | 0.95 |
| 1000 | 8550 | 0.1273 | 0.1243 | 0.1243 | 0.1268 | 0.1257 | 6.9% | 0.1344 | 0.1334 | 0.1337 | 0.1340 | 0.1339 | 9.33 | | 8.20 | 1.13 |
| 1100 | 9405 | 0.1267 | 0.1238 | 0.1237 | 0.1261 | 0.1251 | 7.4% | 0.1341 | 0.1331 | 0.1333 | 0.1337 | 0.1336 | 9.93 | | 8.53 | 1.40 |
| 1200 | 10280 | 0.1258 | 0.1228 | 0.1233 | 0.1254 | 0.1243 | 7.9% | 0.1341 | 0.1331 | 0.1333 | 0.1337 | 0.1336 | 10.68 | | 9.23 | 1.45 |
| 1300 | 11115 | 0.1252 | 0.1217 | 0.1226 | 0.1250 | 0.1236 | 8.4% | 0.1339 | 0.1328 | 0.1330 | 0.1335 | 0.1333 | 11.38 | | 9.93 | 1.45 |
| 1400 | 11970 | 0.1246 | 0.1216 | 0.1218 | 0.1242 | 0.1231 | 8.9% | 0.1336 | 0.1324 | 0.1328 | 0.1331 | 0.1330 | 11.95 | | 10.25 | 1.70 |
| 1500 | 12825 | 0.1240 | 0.1201 | 0.1210 | 0.1242 | 0.1223 | 9.4% | 0.1336 | 0.1324 | 0.1328 | 0.1331 | 0.1330 | 12.68 | | 10.65 | 2.03 |
| 1600 | 13680 | 0.1230 | 0.1195 | 0.1205 | 0.1233 | 0.1216 | 9.9% | 0.1332 | 0.1320 | 0.1324 | 0.1329 | 0.1331 | 13.43 | | 11.48 | 1.95 |
| 1700 | 14535 | 0.1227 | 0.1185 | 0.1198 | 0.1228 | 0.1210 | 10.4% | 0.1332 | 0.1320 | 0.1324 | 0.1329 | 0.1328 | 14.05 | | 11.68 | 2.38 |
| 1800 | 15390 | 0.1220 | 0.1173 | 0.1187 | 0.1223 | 0.1201 | 11.1% | 0.1331 | 0.1312 | 0.1324 | 0.1329 | 0.1324 | 14.93 | | 12.33 | 2.60 |

Fig. 13

PROTON EXCHANGE MEMBRANE (PEM) ELECTROCHEMICAL CELL HAVING AN INTEGRAL, ELECTRICALLY-CONDUCTIVE, RESILIENTLY COMPRESSIBLE, POROUS PAD

CROSS-REFERENCE TO RELATED APPLICATIONS

The present application is a continuation of U.S. patent application Ser. No. 10/335,126, filed Dec. 30, 2002, which in turn is a continuation-in-part of U.S. patent application Ser. No. 09/827,368 filed Apr. 5, 2001, now U.S. Pat. No. 6,500,319, the disclosures of all of which are incorporated herein by reference.

BACKGROUND OF THE INVENTION

The present invention relates generally to proton exchange membrane (PEM) electrochemical cells and relates more particularly to a novel PEM electrochemical cell and to a novel PEM electrochemical cell stack.

In certain controlled environments, such as those found in airplanes, submarines and spacecrafts, it is often necessary for oxygen to be furnished in order to provide a habitable environment. An electrolysis cell, which uses electricity to convert water to hydrogen and oxygen, represents one type of device capable of producing quantities of oxygen. One common type of electrolysis cell comprises a proton exchange membrane, an anode positioned along one face of the proton exchange membrane, and a cathode positioned along the other face of the proton exchange membrane. To enhance electrolysis, a catalyst, such as platinum, is typically present both at the interface between the anode and the proton exchange membrane and at the interface between the cathode and the proton exchange membrane. The above-described combination of a proton exchange membrane, an anode, a cathode and associated catalysts is commonly referred to in the art as a membrane electrode assembly.

In use, water is delivered to the anode and an electric potential is applied across the two electrodes, thereby causing the electrolyzed water molecules to be converted into protons, electrons and oxygen atoms. The protons migrate through the proton exchange membrane and are reduced at the cathode to form molecular hydrogen. The oxygen atoms do not traverse the proton exchange membrane and, instead, form molecular oxygen at the anode.

Often, a number of electrolysis cells are assembled together in order to meet hydrogen or oxygen production requirements. One common type of assembly is a stack comprising a plurality of stacked electrolysis cells that are electrically connected in series in a bipolar configuration. In one type of stack, each cell includes, in addition to a membrane electrode assembly of the type described above, a pair of multi-layer metal screens, one of said screens being in contact with the outer face of the anode and the other of said screens being in contact with the outer face of the cathode. The screens are used to conduct electrons to and from the cathode and anode and to form the membrane-supporting fluid cavities within a cell for the flow of water, hydrogen and oxygen. Each cell additionally includes a pair of polysulfone cell frames, each cell frame peripherally surrounding a set of screens. The frames are used to peripherally contain the fluids and to conduct the fluids into and out of the screen cavities. Each cell further includes a pair of metal foil separators, one of said separators being positioned against the outer face of the anode screen and the other of said separators being positioned against the outer face of the cathode screen. The separators serve to axially contain the fluids on the active areas of the cell assembly. In addition, the separators and screens together serve to conduct electricity from the anode of one cell to the cathode of its adjacent cell. Plastic gaskets seal the outer faces of the cell frames to the metal separators, the inner faces of the cell frames being sealed to the proton exchange membrane. The cells of the stack are typically compressed between a spring-loaded rigid top end plate and a bottom base plate.

Patents and publications relating to electrolysis cell stacks include the following, all of which are incorporated herein by reference: U.S. Pat. No. 6,057,053, inventor Gibb, issued May 2, 2000; U.S. Pat. No. 5,350,496, inventors Smith et al., issued Sep. 27, 1994; U.S. Pat. No. 5,316,644, inventors Titterington et al., issued May 31, 1994; U.S. Pat. No. 5,009,968, inventors Guthrie et al., issued Apr. 23, 1991; and Coker et al., "Industrial and Government Applications of SPE Fuel Cell and Electrolyzers," presented at The Case Western Symposium on "Membranes and Ionic and Electronic Conducting Polymer," May 17-19, 1982 (Cleveland, Ohio).

In order to ensure optimal conversion of water to hydrogen and oxygen by each electrolysis cell in a stack, there must be uniform current distribution across the active areas of the electrodes of each cell. Such uniform current distribution requires uniform contact pressure over the active areas of the electrodes. However, uniform contact pressure over the active areas is seldom attained solely through design since the dimensions of the various components of a cell typically vary within some specified limits due to the production methods used in their fabrication. In fact, standard electrolysis cells often show compounded component dimensional variations of about 0.007 to about 0.010 inch due to fabrication limitations, with additional dimensional variations of up to about 0.002 inch due to differential thermal expansion during electrolysis cell operation.

One approach to the aforementioned problem of maintaining uniform contact pressure over the entire active areas of the electrodes has been to provide an electrically-conductive compression pad between adjacent cells in a stack. One type of electrically-conductive inter-cell compression pad that has received widespread use in the art comprises an elastic disk, said disk being provided with an array of transverse holes and transverse slots. The transverse holes are provided in the disk to allow for lateral expansion during compression of the disk. The transverse slots are provided in the disk so that a plurality of parallel metal strips may be woven from one face of the disk to the opposite face of the disk through the slots.

Other types of electrically-conductive, inter-cell, compression pads are disclosed in the following patents, all of which are incorporated herein by reference: U.S. Pat. No. 5,466,354, inventors Leonida et al., issued Nov. 14, 1995; U.S. Pat. No. 5,366,823, inventors Leonida et al., issued Nov. 22, 1994; and U.S. Pat. No. 5,324,565, inventors Leonida et al., issued Jun. 28, 1994.

Inter-cell compression pads of the type described above comprising an elastic disk having parallel metal strips woven therethroughout are generally capable of compensating for dimensional variations of a cell to maintain uniform contact over the active areas of the cell up to pressures of about 500 psi. However, for many military and commercial applications, the present inventors have noted that it is important that uniform contact over the active areas of the cell be maintained at pressures in excess of 500 psi and/or that the cell stack be lightweight and inexpensive. As can readily be appreciated, the above-described compression pad, which is in a physically separate compartment from the individual cells of a stack, adds weight and expense to the stack and is, therefore, not optimal for many such applications. Other components of conventional cells, such as the metal screens, also add weight and expense to the stack.

The foregoing discussion has been directed to one type of electrochemical cell, namely, electrolysis cells. Fuel cells are another type of electrochemical cell. Functionally, fuel cells operate analogously to electrolysis cells but in reverse, fuel cells generating water and electricity using molecular hydrogen and molecular oxygen as reactants. Structurally, fuel cells and electrolysis cells are similar, the principal differences between the two types of electrochemical cells being that (i) the membrane electrode assembly of an electrolysis cell is typically thicker than that of a fuel cell to take into account the higher operating pressures at which electrolysis cells operate; (ii) the multi-layer metal screens serving as fluid diffusion media on opposite sides of the membrane electrode assembly of an electrolysis cell are typically replaced with a pair of carbon fiber papers or carbon fiber cloths in a fuel cell; and (iii) the polysulfone cell frames and the metal foil separators of an electrolysis cell are replaced with a pair of bipolar separation plates in a fuel cell, each such bipolar separation plate being provided with a set of molded or machined grooves defining a fluid cavity and having a shelf for receiving its corresponding sheet of carbon fiber paper or carbon fiber cloth.

One difficulty with the use of carbon fiber paper as the fluid diffusion medium in a fuel cell is its inflexibility and fragility, said carbon fiber paper easily fracturing during handling, assembly of the fuel cell and/or use of the fuel cell. Carbon fiber cloth also has its disadvantages as it typically does not have enough rigidity to keep from being drawn into the grooves of a bipolar separation plate, thereby obstructing fluid flow therewithin.

As is the case for an electrolysis cell stack, the maintenance of uniform contact pressure in a fuel cell stack is important.

SUMMARY OF THE INVENTION

It is an object of the present invention to provide a novel PEM electrochemical cell.

It is another object of the present invention to provide a PEM electrochemical cell that overcomes at least some of the shortcomings discussed above in connection with existing PEM electrochemical cells.

According to one aspect of the invention, a PEM electrochemical cell is provided which comprises an electrically-conductive, resiliently-compressible, porous pad positioned within the cathode chamber, said pad permitting the passage of fluids therethrough and replacing the multi-layer screen of an electrolysis cell or the carbon fiber paper or carbon fiber cloth of a fuel cell. Such a pad is preferably resistant to hydrogen embrittlement and preferably comprises a random arrangement of carbon fibers which are bound together using one or more resins, preferably at least one of said one or more resins being a thermoplastic resin, said pad preferably having a density of about 0.2-1.5 $g/cm^3$, more preferably about 0.35-0.77 $g/cm^3$, even more preferably about 0.55-0.77 $g/cm^3$.

It should be noted that, for purposes of the present specification and claims, the term "carbon fibers," as applied to the pad of the present invention, is intended to encompass carbon fibers and/or graphite fibers.

Because the pad of the present invention is compressible and resilient (i.e., capable of substantially returning to its pre-compressed shape when the compressing force is removed), a plurality of pad-containing cells can be arranged in a stack, without requiring that a separate compression pad be interposed between adjacent cells (e.g., between the separator plates of adjacent cells) for the purpose of maintaining uniform pressure over the active areas of the electrodes, provided that any differential pressure greater than about 200 psi is from the hydrogen side of the cell, the hydrogen pressure being greater than the oxygen pressure.

In addition, where the PEM electrochemical cell is an electrolysis cell, because said pad does not typically experience the same problem of fretting corrosion experienced by a conventional multi-layer screen, a metal sheet of the type conventionally used to prevent fretting corrosion associated with the multi-layer screen may also be omitted from the cell, thereby reducing the cost and weight of the cell.

According to another aspect of the invention, where the PEM electrochemical cell is an electrolysis cell, the aforementioned electrically-conductive, resiliently-compressible, cathodic, porous pad and the multi-layer anode screen may be approximately equal in thickness to their corresponding peripheral cell frames or, alternatively, the multi-layer anode screen may be thinner than its peripheral cell frame, with the cathodic, porous pad being thicker (e.g., about 5-10%) than its peripheral cell frame. In the case of the latter alternative, the two normally flat separators used to axially contain the fluid cavities are replaced with two bent or dished separators shaped to conform to the outer faces of the multi-layer screen and the porous pad, respectively (i.e., the cathode chamber projects partially into the anode chamber). Preferably, the reduction in thickness to the multi-layer screen is approximately equal to the increase in thickness of the porous pad, and the two dished separators are identical in shape. Moreover, because the porous pad of the present invention obviates the need for a separate compression pad located between the separator plates of adjacent cells (for gas pressure differentials up to about 200 psi or greater), one of the two separator plates between adjacent cells may be omitted.

According to yet another aspect of the invention, the electrically-conductive, resiliently-compressible, cathodic, porous pad can be made thinner by integrating it with a conductive, less porous member of similar area and diameter, which is placed within the peripheral cathode cell frame between the aforementioned porous pad and the corresponding bipolar separator plate. The conductive, less porous member may be fabricated from solid sheets of materials, such as carbon, titanium, zirconium or composites of these conductive materials in particulate or fiber form, together with polymer binders, such as polyvinylidene fluoride (e.g., Kynar), polyethylene, or polypropylene. In a preferred configuration, the solid member may have a flow field comprising uniform, closely-spaced pin or pillar projections that have been machined, embossed or molded into the solid member surface that faces the aforementioned porous pad and may assist the porous pad in fluid flow, distribution, springiness and support.

According to still yet another aspect of the invention, the electrically-conductive, resiliently-compressible, cathodic, porous pad can be made thinner by integrating it with one or more porous, electrically-conductive components, such as multiple meshes, etched metals, or sinters, which components have a higher porosity than the aforementioned porous pad and which may assist the porous pad in fluid flow, distribution, springiness and support.

It is still another object of the present invention to provide a PEM electrochemical cell stack comprising a plurality of the above-described pad-containing cells.

It is still yet another object of the present invention to provide an electrically-conductive, resiliently-compressible, porous pad of the type described above.

It is still yet a further object of the present invention to provide a method of making the aforementioned pad.

Additional objects, features, aspects and advantages of the present invention will be set forth, in part, in the description which follows and, in part, will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate preferred embodiments of the invention and, together with the description, serve to explain the principles of the invention. In the drawings wherein like reference numerals represent like parts:

FIGS. 11 through 13 are tabular depictions of the experimental data obtained for the respective 0.55 g/cm$^3$, 0.65 g/cm$^3$ and 0.77 g/cm$^3$ porous graphite pads of FIG. 10;

DETAILED DESCRIPTION OF PREFERRED EMBODIMENTS

Figure 1:
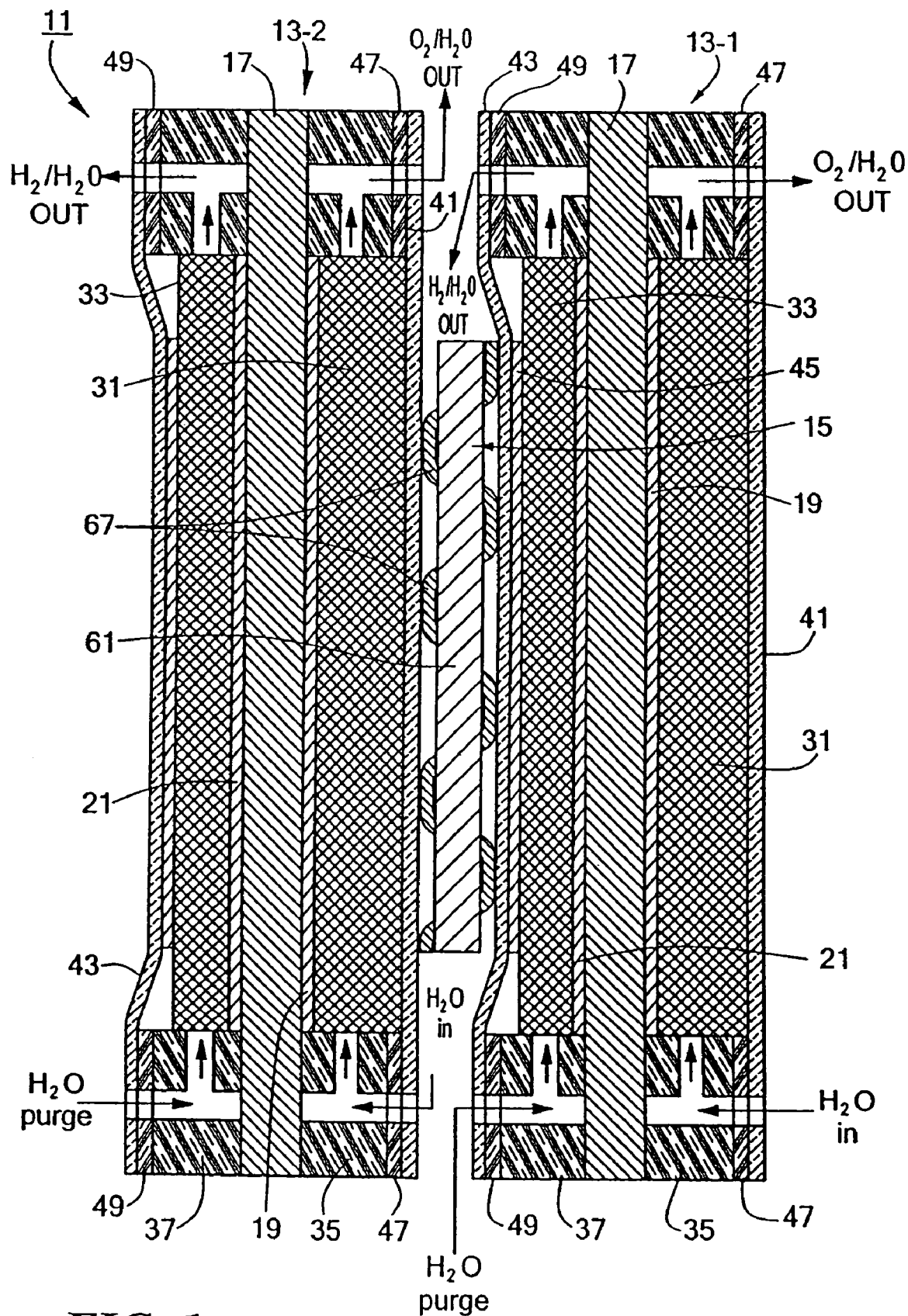
FIG. 1 is a schematic section view of a conventional PEM electrolysis cell stack.

Referring now to FIG. 1, there is shown a schematic section view of a conventional PEM electrolysis cell stack, said conventional PEM electrolysis cell stack being represented generally by reference numeral 11.

Stack 11 comprises a pair of PEM electrolysis cells 13-1 and 13-2 arranged in series in a bipolar configuration and an inter-cell compression pad 15 interposed between cells 13-1 and 13-2 for electrically connecting cells 13-1 and 13-2 and for maintaining uniform contact over the active areas of cells 13-1 and 13-2. Although, for purposes of simplicity and clarity, stack 11 is shown in the present embodiment comprising only two cells 13-1 and 13-2 and a single compression pad 15, it can readily be appreciated that stack 11 may be modified to include as many as one hundred or more cells 13, with each adjacent pair of cells 13 being separated by an interposed compression pad 15.

Each cell 13 includes a proton exchange membrane 17, an anode 19 positioned along one face of proton exchange membrane 17, and a cathode 21 positioned along the other face of proton exchange membrane 17. A platinum film or other suitable catalyst (not shown) is positioned at the interface between anode 19 and proton exchange membrane 17, and a second platinum film or other suitable catalyst (not shown) is positioned at the interface between cathode 21 and proton exchange membrane 17.

Each cell 13 also comprises a pair of multi-layer metal screens 31 and 33. Screen 31 is placed in contact with the outer face of anode 19 and is used to define a fluid cavity through which water may pass and in which molecular oxygen generated at anode 19 may be collected. Screen 33 is placed in contact with the outer face of cathode 21 and is used to define a fluid cavity in which molecular hydrogen generated at cathode 21 may be collected.

Each cell 13 additionally comprises a pair of polysulfone cell frames 35 and 37, cell frame 35 peripherally surrounding screen 31 and cell frame 37 peripherally surrounding screen 33. Frames 35 and 37 are used to peripherally contain the fluids present within screens 31 and 33, respectively, and to conduct the fluids into and out of screens 31 and 33, respectively. Each of frames 35 and 37 typically has a thickness of about 0.060 inch.

Each cell 13 further comprises a pair of separators 41 and 43. Separators 41 and 43 are typically made of a metal foil, such as a titanium foil having a thickness of about 0.005 inch. Separator 41 is positioned against the outer face of screen 31. Separator 43 is positioned against the outer face of an electrically-conductive separator plate 45 which, in turn, is positioned against the outer face of screen 33. (Separator plate 45 prevents screen 33 from experiencing fretting corrosion caused by contact with separator 43.) Separators 41 and 43 serve to axially contain the fluids within screens 31 and 33, respectively. In addition, separators 41 and 43, separator plate 45, and screens 31 and 33 together serve to conduct electricity from anode 19 of cell 13-2 to cathode 21 of cell 13-1.

Each cell 13 also comprises a pair of plastic gaskets 47 and 49, gasket 47 sealing the outer face of frame 35 to separator 41 and gasket 49 sealing the outer face of frame 37 to separator 43. Each of gaskets 47 and 49 typically has a thickness of about 0.005 inch. The inner faces of frames 35 and 37 are sealed to proton exchange membrane 17.

Figure 2:
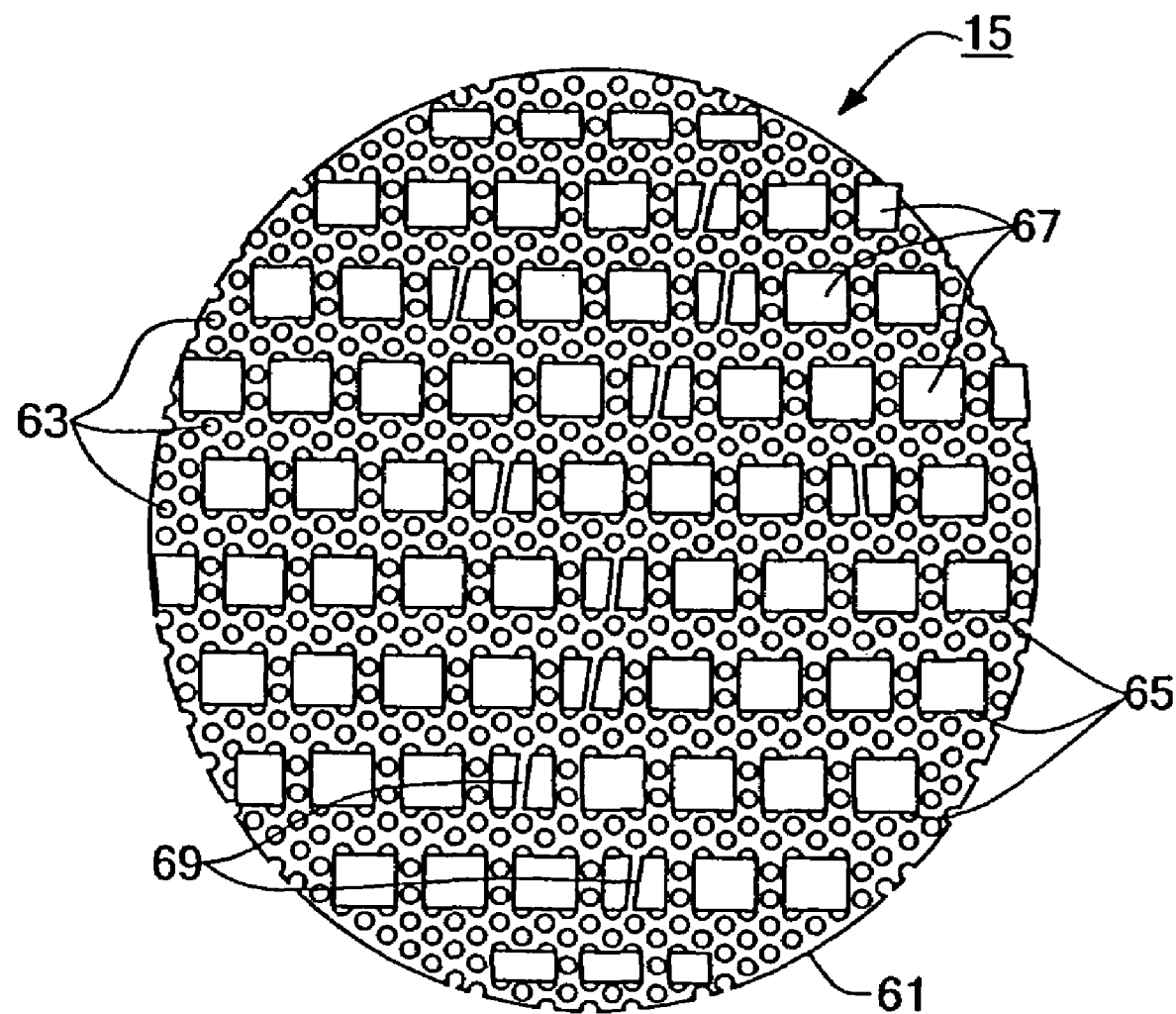
FIG. 2 is a front view of the inter-cell compression pad shown in FIG. 1.

Referring now to FIG. 2, compression pad 15 is shown in greater detail and can be seen to include a spring-like disk 61. Disk 61 is typically made of a silicone rubber and has a thickness of about 0.065 inch. Disk 61 is provided with a patterned array of transverse holes 63 and transverse slots 65. Holes 63 allow for lateral expansion of disk 61 when disk 61 is compressed so that the overall surface area of disk 61 does not increase significantly during compression. Slots 65 are used to receive a plurality of metal strips 67. Strips 67, which typically have a thickness of about 0.005 inch, are woven in a parallel arrangement from one face of disk 61 to the opposite face of disk 61 through slots 65. Strips 67 are typically provided with transverse breaks 69 to allow for expansion.

Referring back to FIG. 1, pad 15 serves to evenly distribute pressure over the entireties of separators 41 and 43 (and, consequently, over the entire active areas of cells 13-1 and 13-2), provided that the differential pressure of either gas in the stack does not exceed about 500 psi. In addition, each strip 67 serves to electrically interconnect separators 41 and 43 at a plurality of points along the length of said strip 67. However, as explained above, the present inventors have noted that compression pad 15 adds weight and expense to stack 11 that, for many military and commercial applications, is undesirable.

Figure 3:
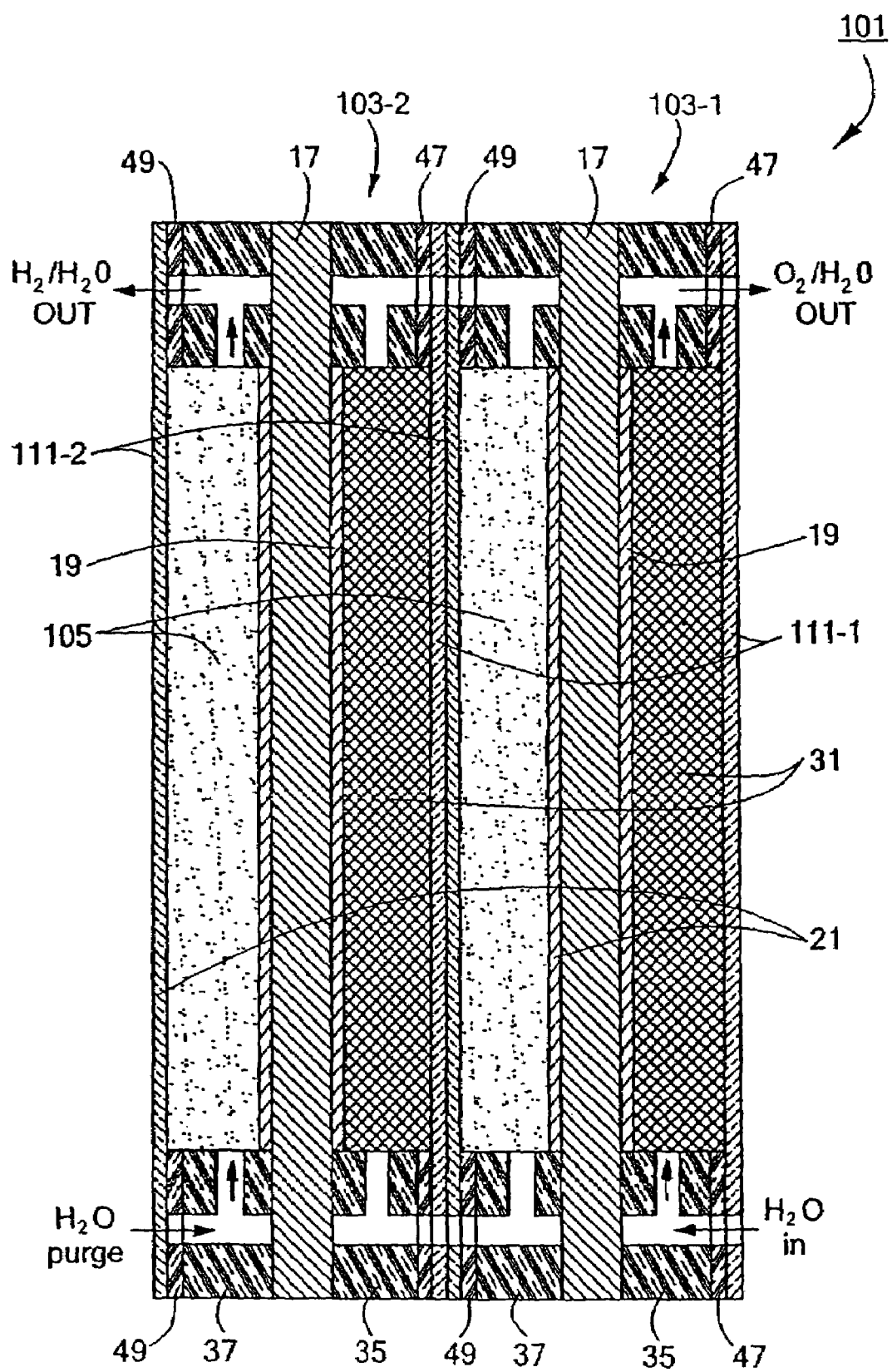
FIG. 3 is a schematic section view of a first embodiment of a PEM electrolysis cell stack constructed according to the teachings of the present invention.

Referring now to FIG. 3, there is shown a schematic section view of a first embodiment of a PEM electrolysis cell stack constructed according to the teachings of the present invention, said PEM electrolysis cell stack being represented generally by reference numeral 101.

Stack 101 is similar in certain respects to stack 11. For instance, stack 101 comprises a pair of cells 103-1 and 103-2 arranged in series in a bipolar configuration (it being understood that stack 101 may be modified to include up to one hundred or more cells 103 arranged in series in a bipolar configuration). Each cell 103 comprises a proton exchange membrane 17, an anode 19 positioned along one face of proton exchange membrane 17, and a cathode 21 positioned along the other face of proton exchange membrane 17. A first platinum film or other suitable catalyst (not shown) is positioned at the interface between anode 19 and proton exchange membrane 17, and a second platinum film or other suitable catalyst (not shown) is positioned at the interface between cathode 21 and proton exchange membrane 17. Each cell 103 also comprises a metal screen 31 placed in contact with the outer face of anode 19, a pair of polysulfone cell frames 35 and 37, and a pair of plastic gaskets 47 and 49.

Stack 101, however, differs notably from stack 11 in that stack 101 does not include screen 33, but rather, in its place comprises an electrically-conductive, resiliently-compressible, porous pad or fluid diffusion medium 105. Preferably, pad 105 comprises a random arrangement of graphite fibers bound together using one or more resins, pad 105 preferably having a density of about 0.2-1.5 $g/cm^3$, more preferably about 0.35-0.77 $g/cm^3$, even more preferably about 0.55-0.77 $g/cm^3$, and preferably having a relaxed or uncompressed thickness of about 5 to 10% greater than the thickness of the frame. (It should be understood that the carbon fibers of pad 105 may be replaced with other materials, provided that the resulting product possesses sufficient chemical compatibility, porosity, electrical conductivity and compressibility. Such a product is also preferably resistant to hydrogen embrittlement.)

A first type of material suitable for use as porous pad 105 is commercially available from Spectracorp (Lawrence, Mass.) as Spectracarb 2050A and comprises a plurality of stacked carbon fiber papers bound together using a thermosetting phenolic binder, each such carbon fiber paper comprising a random array of carbon fibers bound together using a thermosetting phenolic binder. To make such a pad material, one may utilize, for example, the following method: First, prepare a slurry in water of polyacrylonitrile (PAN) fibers and a phenolic binder; next, spread the slurry out to a thin depth; then, heat the thus-spread slurry at a very high temperature (about 2800° C.) to convert the PAN fibers to carbon fibers whereby a sheet of carbon fiber paper is formed; next, prepare a stack of the thus-formed carbon fiber papers, applying a phenolic binder to the interface of adjacent sheets; and then, heat the stack of carbon fiber papers at a suitable temperature (e.g., 2800° C.) to cure, carbonize and graphitize the binder and under a suitable pressure to achieve a desired density.

As can readily be appreciated, the above-described technique for preparing the first type of material for pad 105 involves a pair of heating steps, one to form each individual sheet of carbon fiber paper, the other to form the bound stack. Moreover, at least some of said heating must be conducted at temperatures so high that the heating must be performed in a vacuum or in an inert gas, such as argon. Such requirements add to the manufacturing costs of pad 105. In addition to the foregoing heating requirements, it should be noted, as is mentioned above, that carbon fiber paper is quite fragile and is not easily processed.

The above-described first type of material may further be impregnated with polymeric or elastomeric materials, such as fluoroelastomers, ionomers (e.g., Nafion), polyvinylidene fluoride, polytetrafluoroethylene, etc., to enhance its structural integrity and spring rate, without sacrificing other essential properties, such as high conductivity and porosity.

A second type of material suitable for use as porous pad 105 comprises a unitary, random mat of carbon fibers bound together using at least one thermoplastic binder having a relatively low melting point. (Said thermoplastic binder is preferably also hydrophobic.) An example of a suitable thermoplastic binder is polyvinylidene fluoride (PVDF), which has a melting point of about 170° C. and which is commercially available from Atofina (Paris, France) as KYNAR® PVDF powder. (KYNAR FLEX® PVDF copolymer powder, which has a melting point of about 130°

C., is another suitable thermoplastic binder.) To make the foregoing pad material, one may utilize, for example, the following method: First, chop carbon fiber bundles (e.g., 4 or 7 micron diameter fibers) to a length of approximately ⅛ inch or purchase already chopped fibers; next, mix together in a coffee bean grinder, a V-shell blender (Patterson-Kelley) or a similar device the aforementioned chopped carbon fiber bundles and PVDF powder in an approximately 75:25 to 90:10 ratio, respectively, until the PVDF powder is dispersed over the carbon fibers (if desired, the chopped carbon fiber bundles may be replaced with, for example, a mixture, such as an 85:15 mixture, of chopped carbon fiber bundles and milled carbon fiber bundles); then, lay the dry mixture in a mold or on a flat surface; and then, heat the mixture until the PVDF powder melts (about 170° C.) while applying sufficient pressure to achieve a desired density.

Alternatively, one may make the foregoing pad material as follows: First, after mixing PVDF powder with chopped or chopped and milled carbon fibers in the manner described above, the mixture is then heated in an oven until the PVDF powder begins to melt; next, the thus-heated material is removed from the oven, pulled apart and made into a slurry with water; then, the slurry is formed into a blanket shape; and then, the slurry is heated under pressure until dried to a desired density.

Although the latter method for forming the second type of pad material has two heating steps, as opposed to the one heating step recited in the former method, it is believed that the latter method is more apt to result in a pad having a more uniform composition, which is clearly a desirable outcome.

Still another method for forming the second type of pad material is as follows: First, chopped carbon fibers as described above are impregnated with a solution of PVDF, e.g., by dipping the fibers into a vat containing a solution of PVDF in a suitable solvent, such as acetone; next, the wet fibers are laid down to form a blanket; and then, the blanket is heated under pressure to a desired density, the solvent evaporating during such heating.

Still yet another method for forming the second type of pad material involves passing a random arrangement of impregnated carbon fibers as described above through hot rotating cylinders (or through a plurality of alternating hot and cool cylinders) so as to weld the fibers into a porous pad.

As alluded to above, to make pad 105, one may use a combination of thermoplastic binders, instead of using just one thermoplastic binder. An example of a preferred combination of thermoplastic binders is PVDF (or PVDF copolymer) and polytetrafluoroethylene (Teflon®). Polytetrafluoroethylene (PTFE) is more hydrophobic than PVDF, and the combination of PVDF and PTFE is desirable if one wishes pad 105 to have more hydrophobic properties than a pad made with PVDF alone. (Hydrophobicity is more desirable in fuel cell applications than in electrolysis cell applications.) However, the use of PTFE, in the absence of another thermoplastic binder, is generally not preferred as PTFE is a comparatively poor binder, at least as compared to PVDF.

When using a combination of thermoplastic binders, it may be desirable first to blend the carbon fibers with the higher melting temperature resin alone and then to sinter the blend (preferably followed by chopping the clumps formed as a result thereof) before blending with the lower melting resin. For example, if one were using PVDF and PTFE as the thermoplastic binders (PTFE having a melting temperature of about 360° C.), one may wish to blend the carbon fibers with PTFE alone; sinter the blend at 360° C.; chop the sintered carbon fiber/polytetrafluoroethene; blend PVDF into the mixture; dry-lay a blanket of the blend; and heat at 200° C. while applying compression. In fact, where the thermoplastic binder having the lower melting temperature is not thermally stable at the melting temperature for the higher melting binder (which is not the case for PVDF and PTFE), it is essential that this type of procedure be followed.

Pad 105 may further be impregnated with polymeric or elastomeric materials, such as fluoroelastomers, ionomers (e.g., Nafion), etc., to enhance its structural integrity and spring rate, without sacrificing other essential properties, such as high conductivity and porosity.

Although both the first type of pad material (i.e., carbon fiber paper stack bound with thermosetting binder) and the second type of pad material (i.e., carbon fiber mat bound with thermoplastic binder) are suitable for practicing the present invention, there are certain advantages possessed by the second type of pad material over the first type of pad material. Some of these advantages are as follows: the second type of pad material can be fabricated using carbon fibers, as opposed to PAN fibers, as a starting material; the heating step required for fabricating the second type of material does not need to be conducted in a vacuum or in the presence of an inert gas; the heating step required for fabricating the second type of material can be performed at a much lower temperature than that for the first type of material; some of the methods for making the second type of material do not require a second heating step; the second type of material does not require the handling of fragile carbon fiber sheets; the second type of material is more resiliently compressible than the first type of material; and the second type of material is able to withstand far greater pressures than the first type of material.

Because pad 105 is resiliently compressible up to gas differential pressures of about 400 psi or greater, one advantage of stack 101, as compared to stack 11, is that inter-cell compression pad 15 may be omitted from stack 101, thereby resulting in a reduction in cost and weight to stack 101. In addition, because pad 105 is unlikely to experience fretting corrosion, separator plate 45 may also be omitted from stack 101, thereby resulting in a further reduction in cost and weight to stack 101. Moreover, pad 105, itself, is typically lighter and cheaper than multi-layer metal screen 33, which is typically made of zirconium and which requires the welding together of its component layers. (In addition, platinum plating is also often applied to screen 33 to minimize contact resistance.) Furthermore, unlike metal screen 33, pad 105 is unlikely to become embrittled due to prolonged exposure to hydrogen gas.

Stack 101 further differs from stack 11 in that stack 101 includes a pair of flat metal foil separators 111-1 and 111-2, instead of a flat separator 41 and a dished separator 43, separator 43 being shaped to accommodate compression pad 15.

Figure 4:
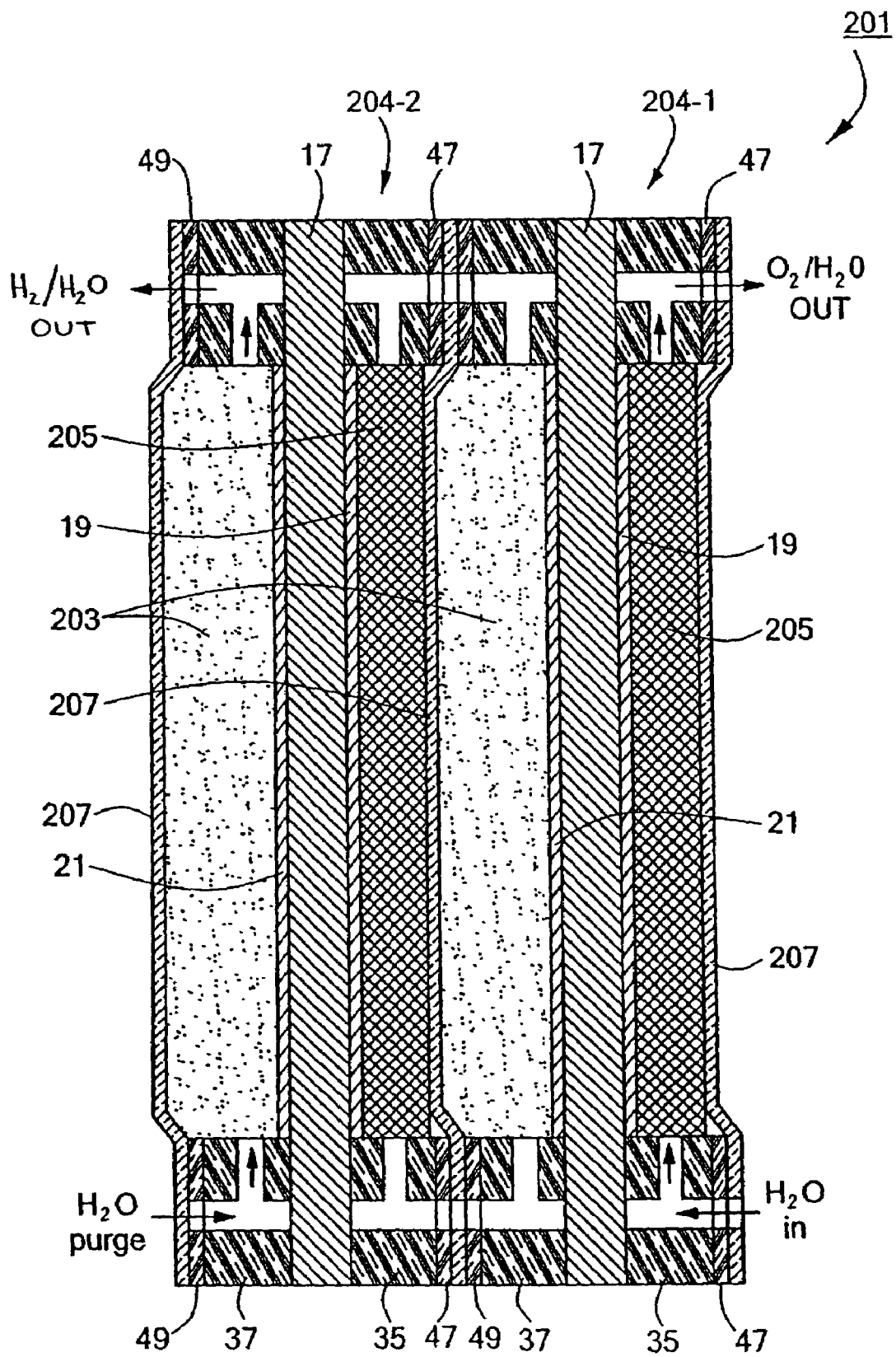
FIG. 4 is a schematic section view of a second embodiment of a PEM electrolysis cell stack constructed according to the teachings of the present invention.

Referring now to FIG. 4, there is shown a schematic section view of a second embodiment of a PEM electrolysis cell stack constructed according to the teachings of the present invention, said PEM electrolysis cell stack being represented generally by reference numeral 201.

Stack 201 is similar in many respects to stack 101, the principal differences between the two stacks being that (i) pad 105 of stack 101 is replaced with a pad 203 in stack 201, pad 203 being identical to pad 105, except that pad 203 has an increased relaxed or uncompressed thickness of about 0.11 inch (and a compressed thickness of about 0.095 inch); (ii) screen 31 of stack 101 is replaced with a screen 205 in stack 201, screen 205 being similar to screen 31 but having fewer layers and having a reduced thickness of about 0.035 inch (as compared to a thickness of about 0.060 inch for screen 31); and (iii) separators 111-1 and 111-2 of stack 101 are with replaced with a single separator 207, separator 207 being positioned between a pair of adjacent cells 204-1 and 204-2 and having a bent shape (i.e., hat-shaped) to conform to the outer face of screen 205 for cell 204-2 and the outer face of pad 203 (as well as a portion of the top and bottom of pad 203) for cell 204-1.

The following examples are provided for illustrative purposes only and are in no way intended to limit the scope of the present invention:

EXAMPLE 1

Figure 5:
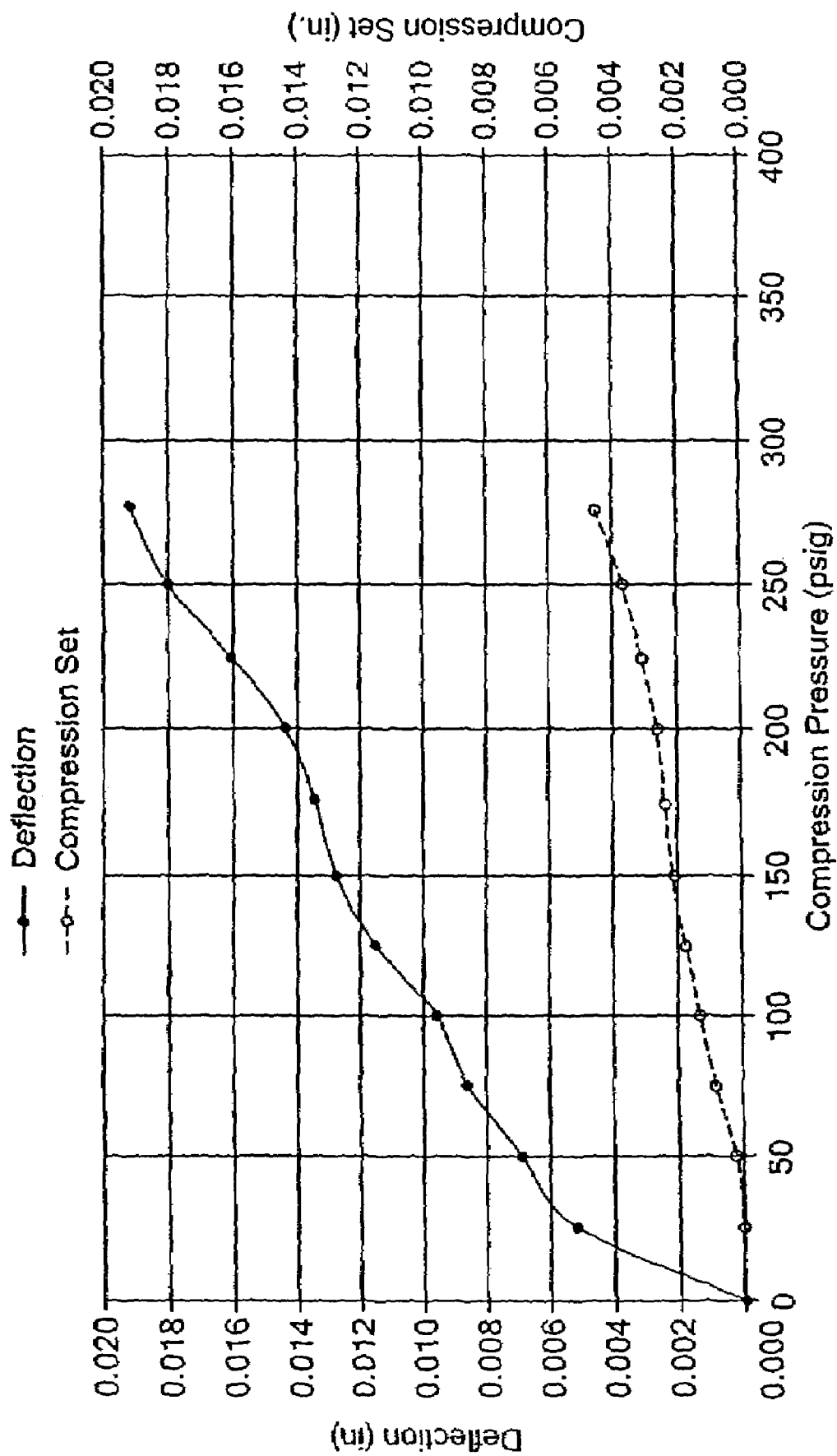
FIG. 5 is a graphic depiction of the deflection (i.e., spring rate) and compression set, as a function of compression pressure, of a 0.44 g/cm$^3$ porous graphite pad having a diameter of 5.6 inches and a nominal thickness of 0.085 inch, said graphite pad being incorporated into a PEM electrolysis cell of the type shown in FIG. 3.
Figure 6:
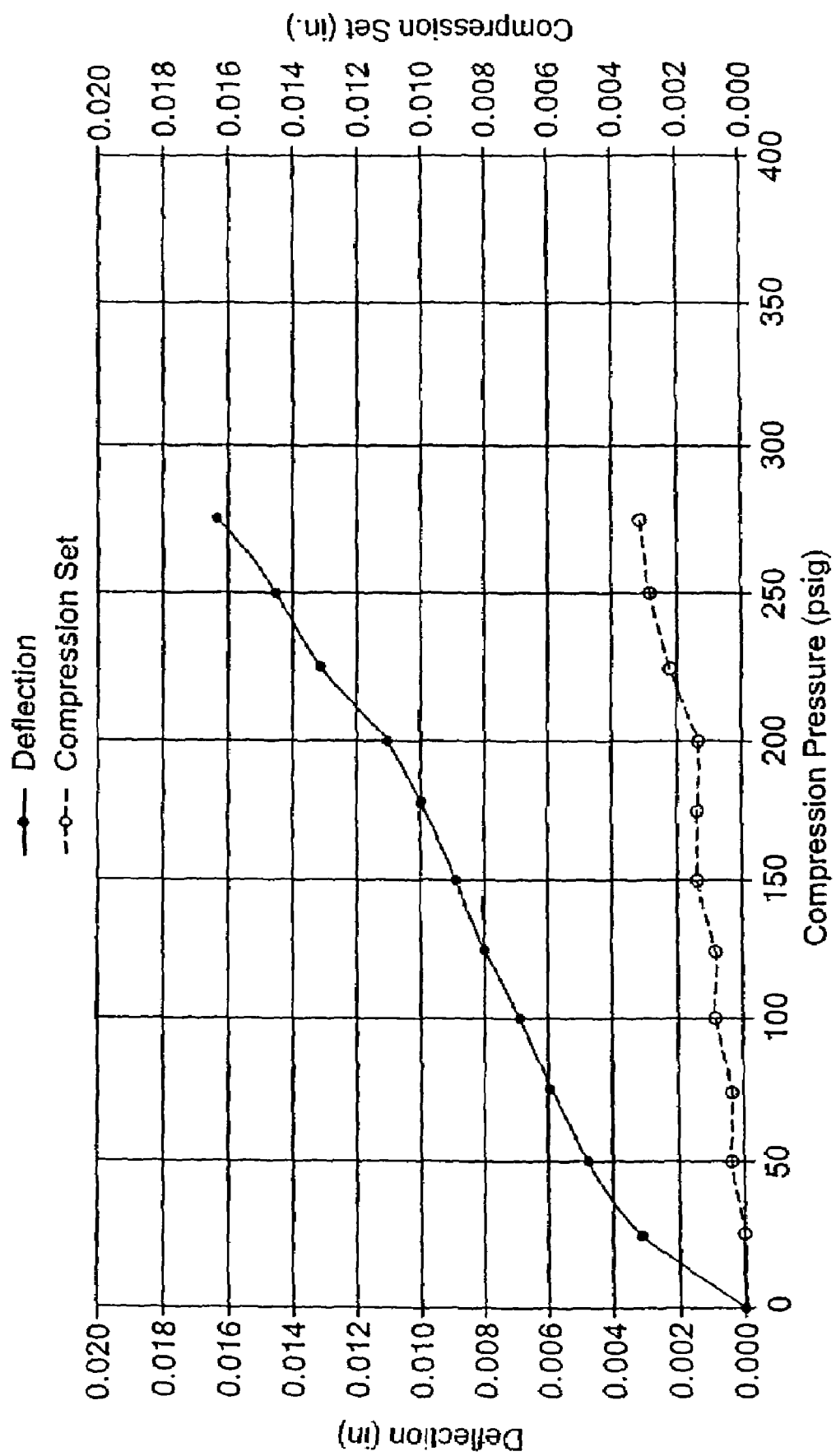
FIG. 6 is a graphic depiction of the spring rate and compression set, as a function of compression pressure, of a 0.48 g/cm$^3$ porous graphite pad having a diameter of 5.6 inches and a nominal thickness of 0.084 inch, said graphite pad being incorporated into a PEM electrolysis cell of the type shown in FIG. 3.
Figure 7:
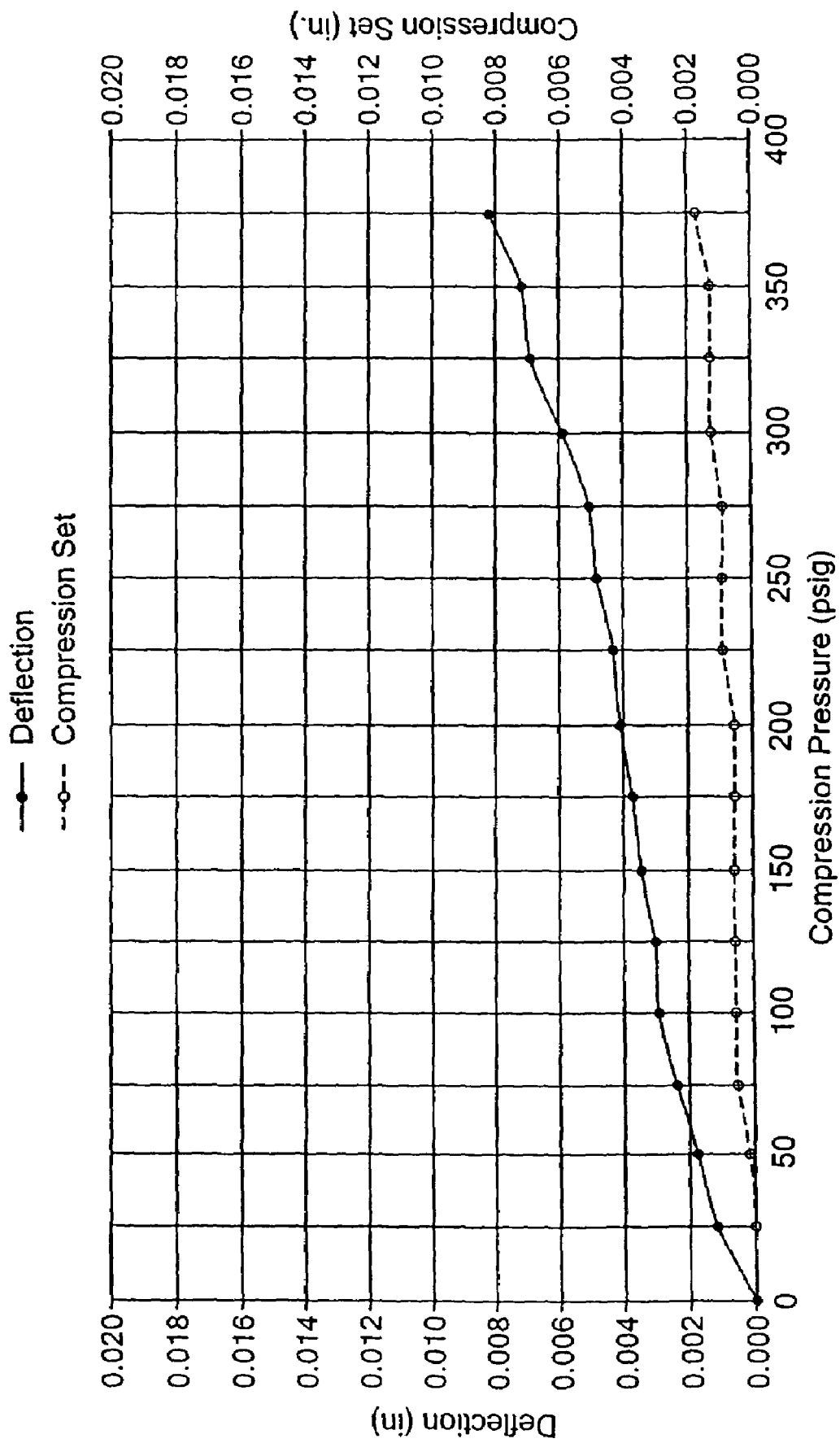
FIG. 7 is a graphic depiction of the spring rate and compression set, as a function of compression pressure, of a 0.55 g/cm$^3$ porous graphite pad having a diameter of 5.6 inches and a nominal thickness of 0.079 inch, said graphite pad being incorporated into a PEM electrolysis cell of the type shown in FIG. 3.

Three different compression pads 105 (of the type wherein a stack of carbon fiber papers are bound together with a thermosetting binder) having respective densities of 0.44 g/cm$^3$, 0.48 g/cm$^3$ and 0.55 g/cm$^3$, respective thicknesses of 0.085 inch, 0.084 inch and 0.079 inch, and each having a diameter of 5.6 inches were tested for both spring rate and compression set by incorporation into three corresponding individual cells 103. The results of said testing are graphically depicted in FIGS. 5 through 7, respectively. As can be seen, the most desirable pad 105 of the three tested was the pad having a density of 0.55 g/cm$^3$ since it resulted in the most modest range of deflection in the pressure range of interest (200 to 500 psi), with negligible compression set or structural degradation.

EXAMPLE 2

Figure 8:
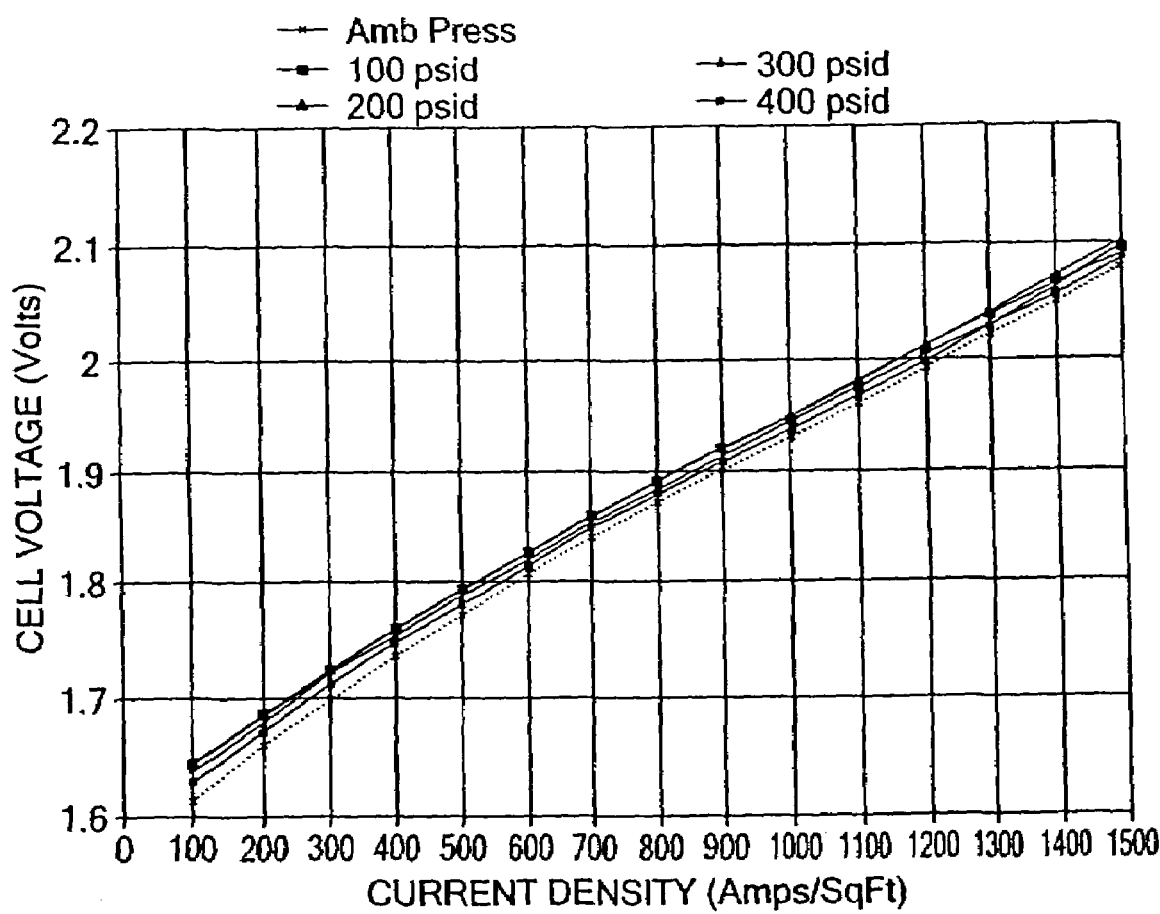
FIG. 8 is a graphic depiction of the electrolyzing performance, as a function of differential pressure, of an individual PEM electrolysis cell comprising a 0.55 g/cm$^3$ porous graphite pad having a thickness of 0.08 inch and a diameter of 1.25 inch.

The electrolyzing performance of a cell 103 comprising a pad 105 (of the type wherein a stack of carbon fiber papers are bound together with a thermosetting binder) having a density of 0.55 g/cm$^3$ and a diameter of 1.25 inch was tested as a function of the differential between the hydrogen pressure and the oxygen pressure (oxygen being generated at ambient pressure). The results are shown in FIG. 8. As can be seen, there was essentially no change in performance for differential pressures up to 400 psi, indicating good spring rate and no compression set. It is believed that polytetrafluoroethylene impregnation of the pad would further enhance structural integrity and spring rate, without sacrificing other essential properties.

EXAMPLE 3

Figure 9:
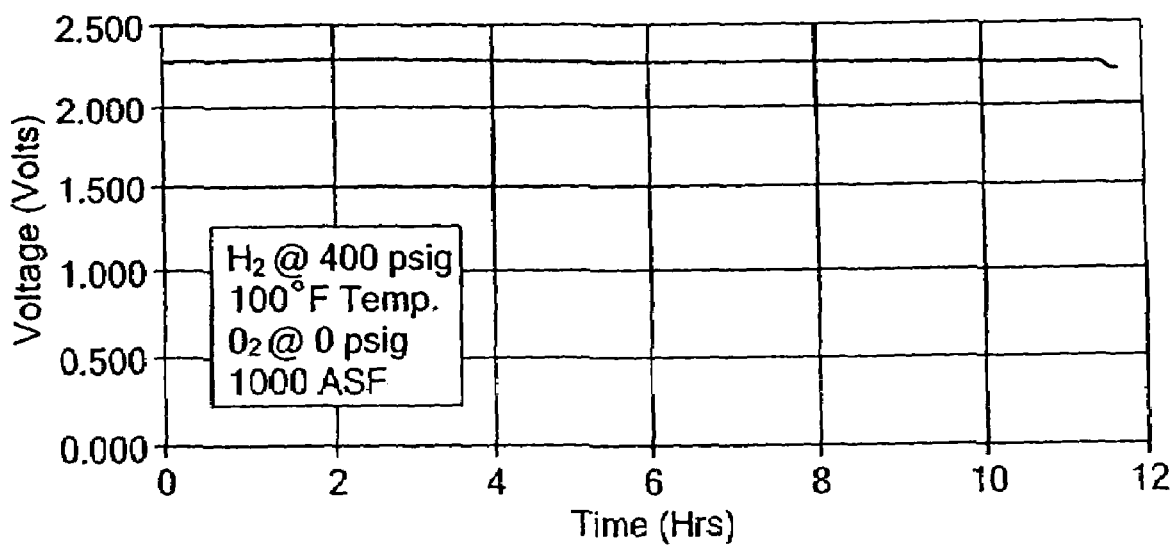
FIG. 9 is a graphic depiction of the electrolyzing performance, as a function of time, of an individual PEM electrolysis cell comprising a 0.44 g/cm$^3$ porous graphite pad having a thickness of 0.08 inch and a diameter of 1.25 inch, said cell being operated at a differential pressure of 400 psi.

The electrolyzing stability of a cell 103 comprising a pad 105 (of the type wherein a stack of carbon fiber papers are bound together with a thermosetting binder) having a density of 0.44 g/cm$^3$ and a diameter of 1.25 inch was tested over a 12 hour period at a differential pressure of 400 psi. The results are shown in FIG. 9. As can be seen, the cell 103 remained very stable over the entire period in question.

EXAMPLE 4

Figure 10:
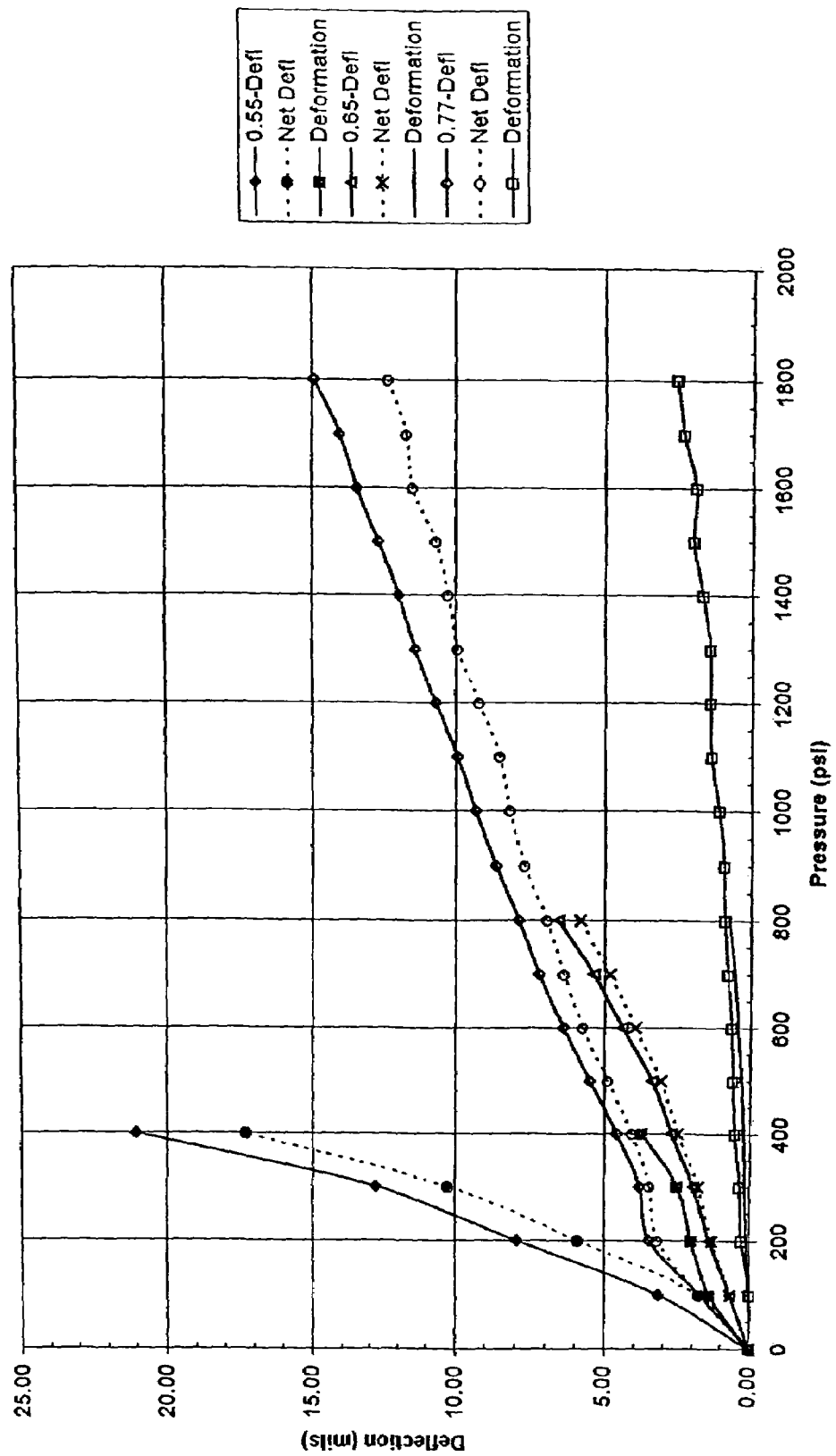
FIG. 10 is a graphic depiction of the spring rate properties, as a function of compression pressure, of three approximately 0.13 inch thick porous graphite pads having respective densities of 0.55 g/cm$^3$, 0.65 g/cm$^3$ and 0.77 g/cm$^3$.

Three different compression pads 105 (of the type wherein a stack of carbon fiber papers are bound together with a thermosetting binder) having respective densities of 0.55 g/cm$^3$, 0.65 g/cm$^3$ and 0.77 g/cm$^3$ and each having a thickness of approximately one-eighth inch were tested for various spring rate properties (deflection vs. pressure applied). The results of said testing are graphically depicted in FIG. 10, the values plotted therein being the deflection, the deformation (permanent thickness change) and the net deflection (deflection less deformation), all as a function of applied pressure. (The experimental data for each of the 0.55 g/cm$^3$, 0.65 g/cm$^3$ and 0.77 g/cm$^3$ pads are also presented in tabular form in FIGS. 11 through 13, respectively.) The deflection and deformation at each pressure increment were determined by compressing each compression pad 105 between two metal plates with small pieces of lead positioned around the periphery of the pad between the plates and then measuring the thicknesses of the small pieces of lead and the pad 105 to derive the deflection and the deformation, respectively. As can be seen, the higher density samples (0.65 g/cm$^3$ and 0.77 g/cm$^3$) exhibited greater pressure capability for the same deflection with less permanent deformation. This feature endows a cell with stronger mechanical support properties while relieving some of the sealing load that is otherwise transferred to the plastic cell frames of the cell when the cell is not operating (unpressurized).

EXAMPLE 5

A mixture of 4 g of chopped carbon fiber bundle Fortafil 150 (⅛ inch in length, 7 microns in diameter, and 95% carbon—commercially available from Fortafil Fibers, Inc., Knoxyille, Tenn.), 1 g of milled carbon fiber Fortafil 342 (about 200 microns in average length, 7 microns in diameter and 95% carbon—commercially available from Fortafil Fibers, Inc.) and 2 g of Kynar® 721 PVDF powder (about 0.3 microns in diameter) was vigorously shaken in a plastic bag for initial blending. This mixture was then processed in a small blade-type coffee bean grinder to break up carbon fiber bundles into single fibers and to uniformly blend carbon fibers and PVDF particles. Primarily because of the small size of the grinder, this blending was done in about 15 batches. After the blending, the carbon fiber surface appeared to have been decorated rather uniformly by the PVDF particles, as observed using a scanning electron microscope.

Figure 14:
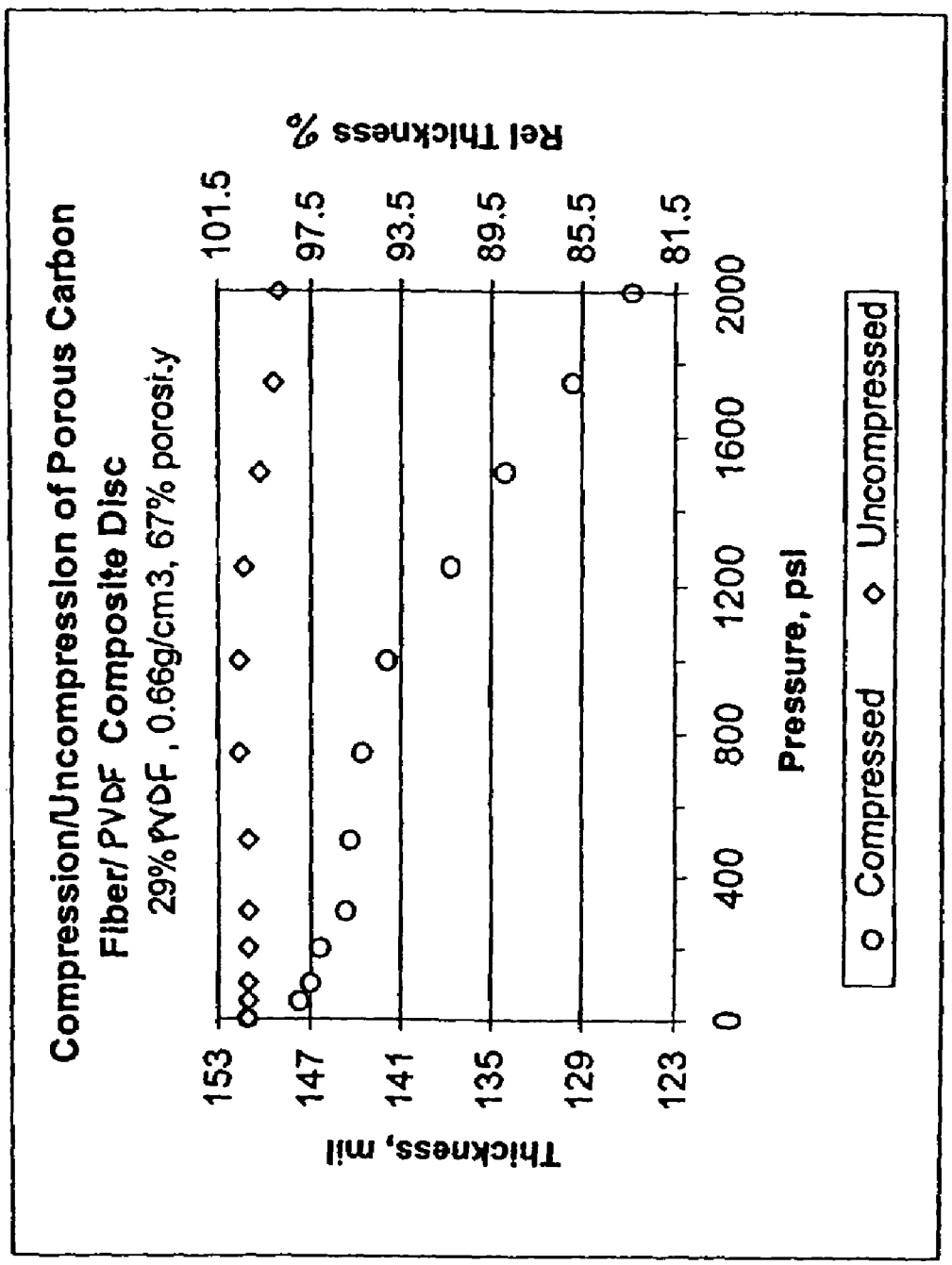
FIG. 14 is a graphic representation of the resilient compressibility of the pad fabricated in Example 5.

A 5.7 cm (in diameter) mold was filled with 6.41 g of the blended material, which was then compressed to 3.83 mm, heated at 200° C. for two hours and cooled to ambient temperature while still being compressed. The density of the resultant disc (i.e., pad) was 0.66 g/cm$^3$, and its PVDF content was 28.6%. The resilient compressibility of this disc at various pressures is shown in FIG. 14. As can be seen, even following compression at pressures as great as 2000 psi, the pad regained well over 97.5% of its thickness.

EXAMPLE 6

A mixture of 4.8 g of chopped carbon fiber bundle Fortafil 150, 1.2 g of milled carbon fiber Fortafil 342 and 1.1 g of Kynar® 721 PVDF powder was vigorously shaken in a plastic bag for initial blending. This mixture was processed in a small blade-type coffee bean grinder to break up carbon fiber bundles into single fibers and to uniformly blend carbon fibers and PVDF particles. Primarily because of the small size of the grinder, the blending was done in about 15 batches.

Figure 15:
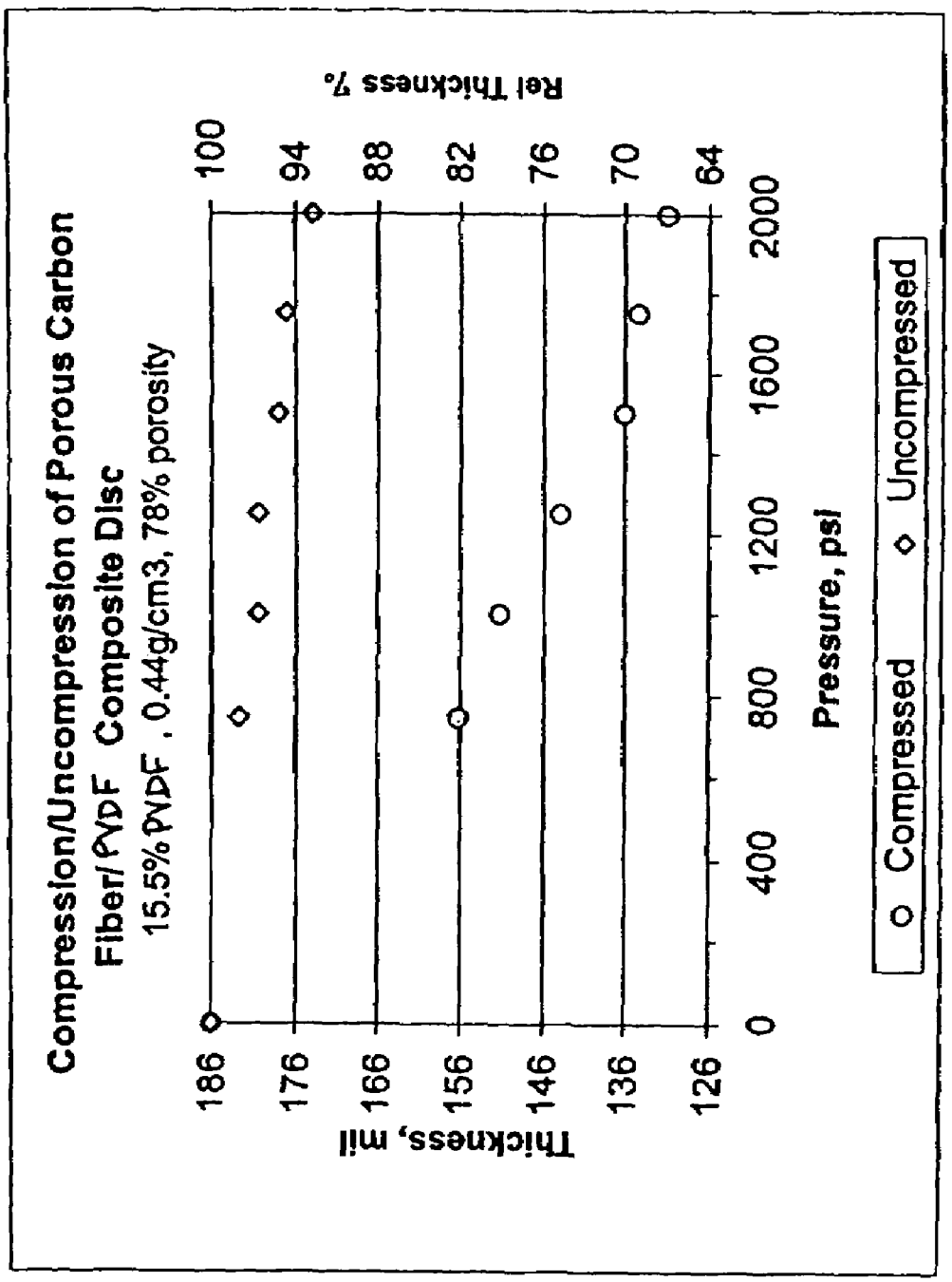
FIG. 15 is a graphic representation of the resilient compressibility of the pad fabricated in Example 6.

A 5.7 cm (in diameter) mold was filled with 5.09 g of the blending material, which was compressed to 4.5 mm, heated at 200° C. for two hours and cooled to ambient temperature while still being compressed. The density of the resultant disc (i.e., pad) was 0.44 g/cm$^3$ and its PVDF content was 15.5%. The resilient compressibility of this disc at various pressures is shown in FIG. 15. As can be seen, even following compression at pressures as great as 2000 psi, the pad regained almost 94% of its thickness.

EXAMPLE 7

A mixture of 4.0 g of chopped carbon fiber bundle Fortafil 150, 1 g of milled carbon fiber Fortafil 342 and 0.56 g of Kynar® 721 PVDF powder was vigorously shaken in a plastic bag for initial blending. This mixture was processed in a blade-type Techmar A-10 Analytical Mill to break up carbon fiber bundles into single fibers and to uniformly blend carbon fibers and PVDF particles. Primarily because of the small size of the grinder, the blending was done in about 15 batches. Because the Techmar Mill employed higher rpm than the coffee bean grinder, chopped carbon fibers were broken up more significantly.

Figure 16:
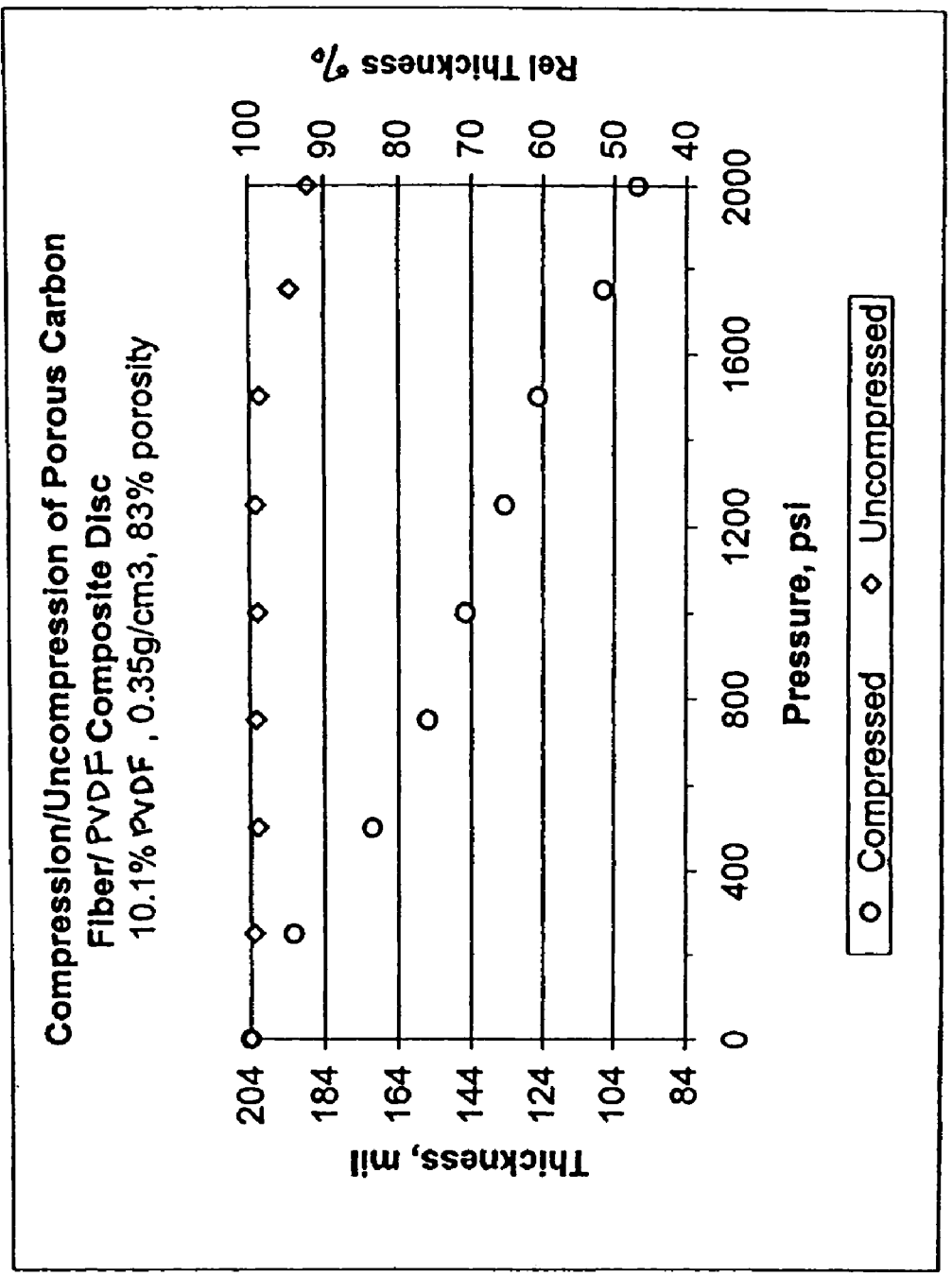
FIG. 16 is a graphic representation of the resilient compressibility of the pad fabricated in Example 7.

A 5.7 cm (in diameter) mold was filled with 4.47 g of the blending material, which was compressed to 5.05 mm, heated at 200° C. for two hours and cooled to ambient temperature while still being compressed. The density of the resultant disc (i.e., pad) was 0.35 g/cm$^3$ and its PVDF content was 10.1%. The resilient compressibility of this disc at various pressures is shown in FIG. 16. As can be seen, even following compression at pressures as great as 2000 psi, the pad regained over 90% of its thickness.

Figure 17:
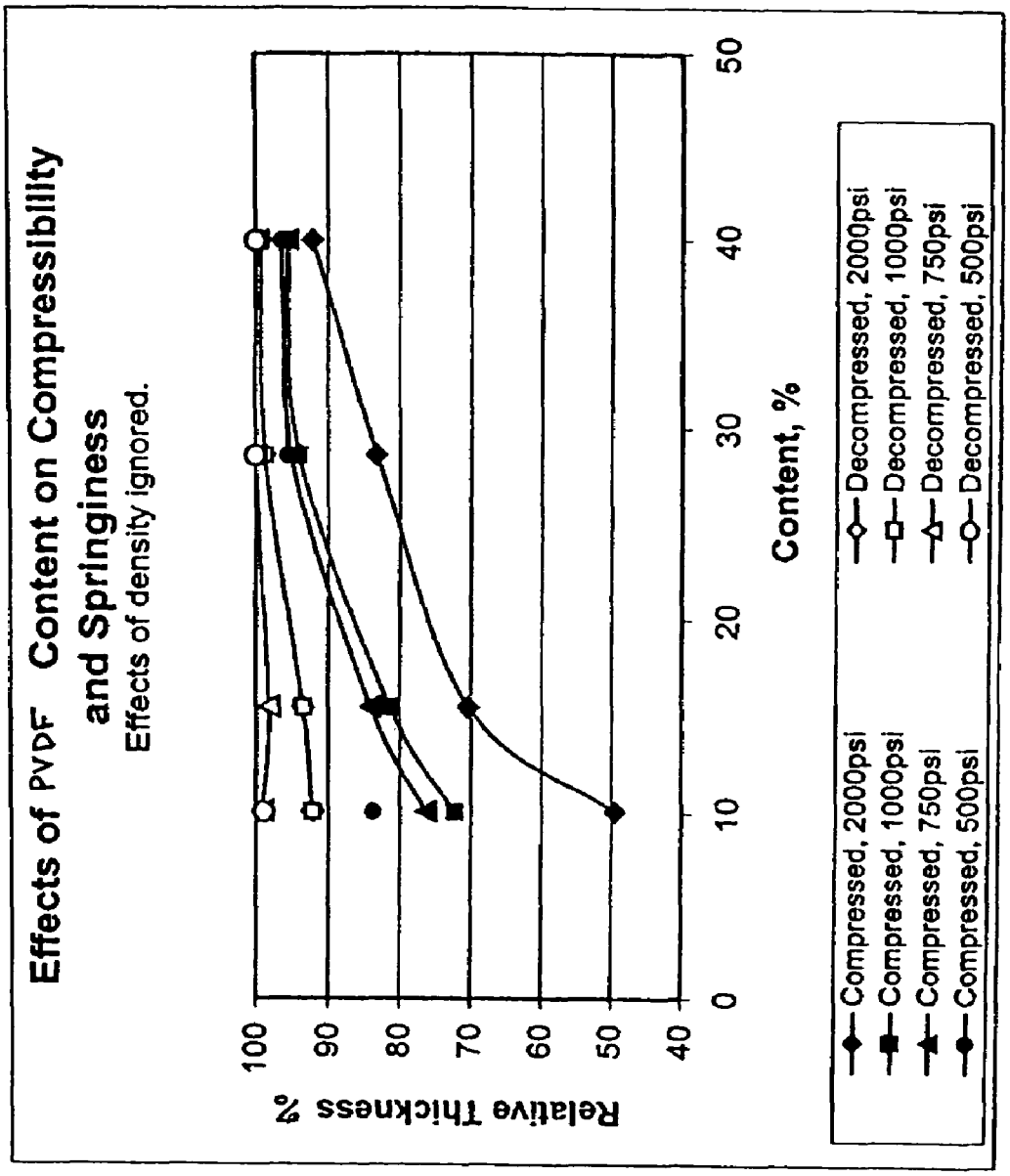
FIG. 17 is a graph comparing the springiness and compressibility of pads of the carbon fiber mat bound with thermoplastic binder variety as a function of PVDF content.

Referring now to FIG. 17, there is shown a graph comparing the springiness and compressibility of pads of varying PVDF content wherein the pads are the type wherein a carbon fiber mat is bound with PVDF. As can be seen, optimal compressibility appears to occur where PVDF content is in the range of about 5-40%, more preferably about 10-25%.

Figure 18:
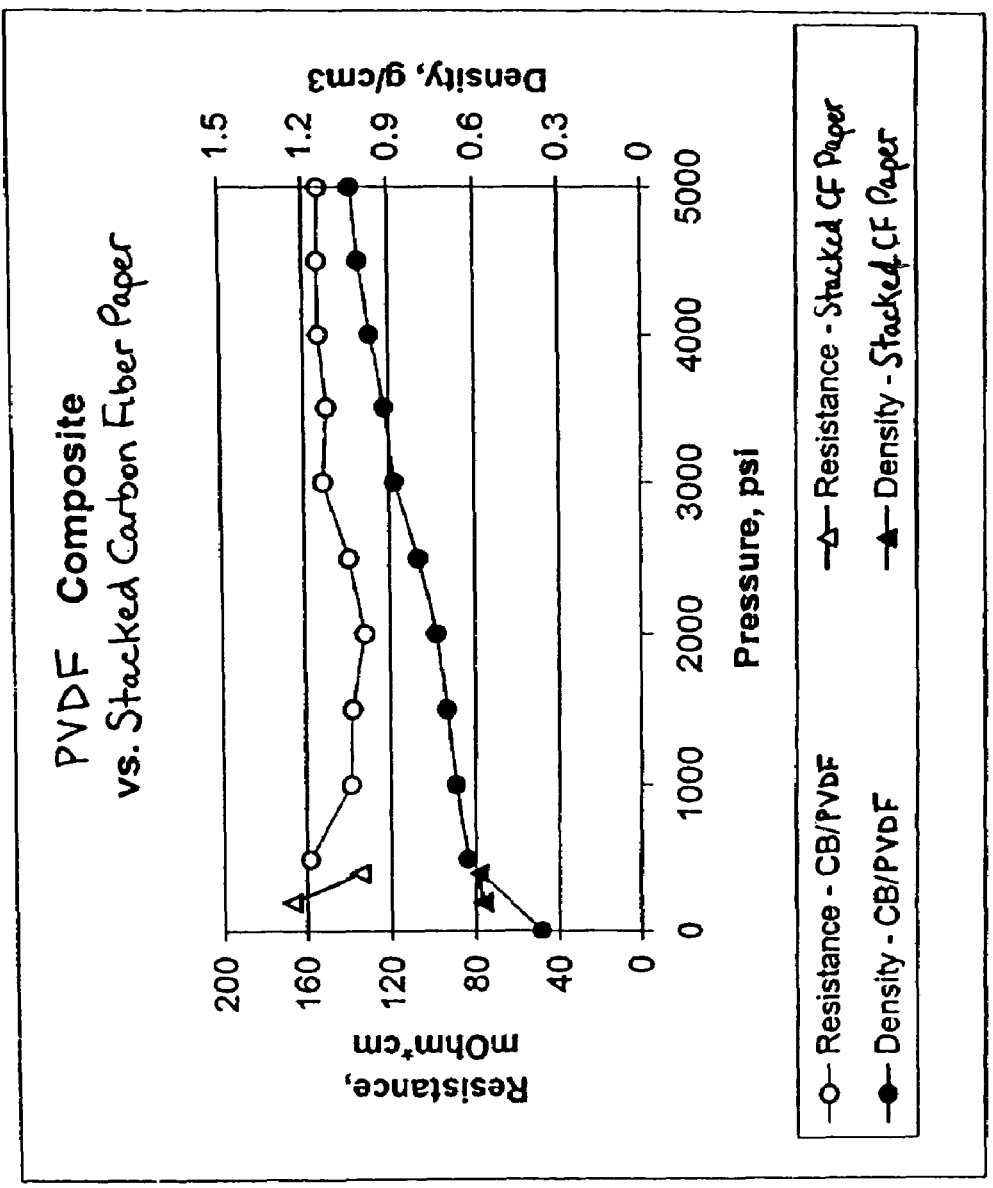
FIG. 18 is a graph comparing the density and electrical resistance of the pad of FIG. 8 with the pad of Example 7.

Referring now to FIG. 18, there is shown a graph comparing the density and electrical resistance of the pad of FIG. 8 (said pad being of the carbon fiber paper stack bound with thermosetting binder variety) with the pad of Example 7 (said pad being of the carbon fiber mat bound with thermoplastic binder variety). As can be seen, the density and the resistance for the two types of pads were comparable; however, it is notable that the pad of Example 7 was able to withstand much greater pressures than the pad of FIG. 8 (which crumbled at about 400 psi).

Figure 19:
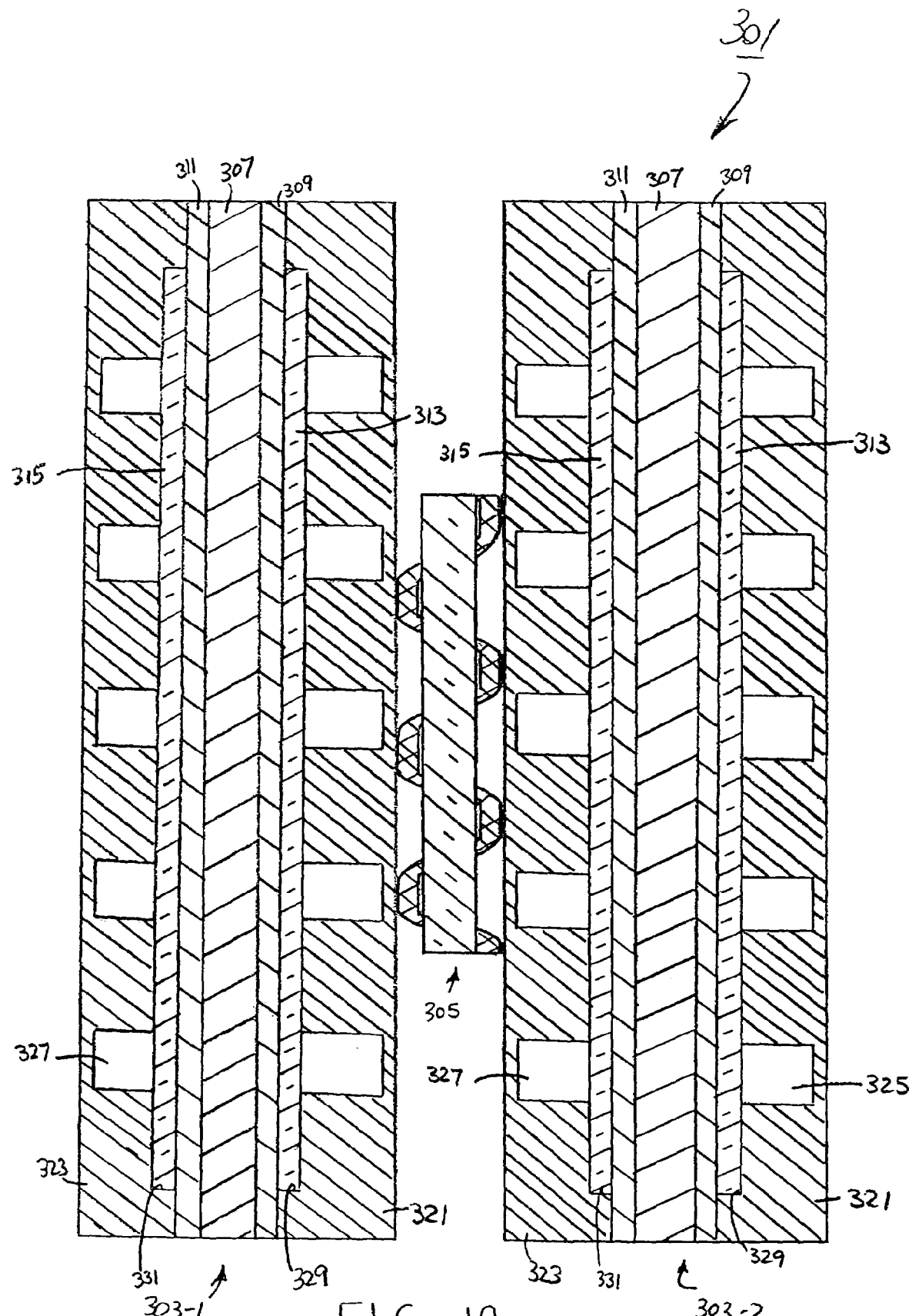
FIG. 19 is a schematic section view of a conventional PEM fuel cell stack.

Referring now to FIG. 19, there is shown a schematic section view of a conventional PEM fuel cell stack, said conventional PEM fuel cell stack being represented generally by reference numeral 301.

Stack 301 comprises a pair of PEM fuel cells 303-1 and 303-2 arranged in series in a bipolar configuration and an inter-cell compression pad 305 interposed between cells 303-1 and 303-2 for electrically connecting cells 303-1 and 303-2 and for maintaining uniform contact over the active areas of cells 303-1 and 303-2. Although, for purposes of simplicity and clarity, stack 301 is shown in the present embodiment comprising only two cells 303-1 and 303-2 and a single compression pad 305, it can readily be appreciated that stack 301 may be modified to include as many as one hundred or more cells 303, with each adjacent pair of cells 303 being separated by an interposed compression pad 305 (pad 305 being identical to pad 105).

Each cell 303 includes a proton exchange membrane 307, an anode 309 positioned along one face of proton exchange membrane 307, and a cathode 311 positioned along the other face of proton exchange membrane 307. A platinum film or other suitable catalyst (not shown) is positioned at the interface between anode 309 and proton exchange membrane 307, and a second platinum film or other suitable catalyst (not shown) is positioned at the interface between cathode 311 and proton exchange membrane 307.

Each cell 303 also comprises a pair of carbon fiber papers 313 and 315. Paper 313, which is about 10 mils thick, is placed in contact with the outer face of anode 309 and is used to define a fluid diffusion medium through which hydrogen gas may pass. Paper 315, which is about 10 mils thick, is placed in contact with the outer face of cathode 311 and is used to define a fluid diffusion medium through which water generated at cathode 311 and molecular oxygen may pass. Each of papers 313 and 315 comprises a random mat of carbon fibers bound together using a thermosetting binder. Although not shown in the present embodiment, paper 315 may have adhered to its cathode-facing side a waterproofing coating of carbon black and PTFE.

As noted above, papers 313 and 315 are brittle and inflexible and have very little, if any, ability to be compressed and then to spring-back to its pre-compressed shape.

Each cell 303 further comprises a pair of bipolar separation plates 321 and 323. Bipolar separation plate 321, which is made of an electrically-conductive material, is provided with a set of molded or machined grooves 325 defining a fluid cavity and a peripheral shelf 329 for receiving paper 313. Bipolar separation plate 323, which is made of an electrically-conductive material, is provided with a set of molded or machined grooves 327 defining a fluid cavity and a peripheral shelf 331 for receiving paper 315.

In another conventional type of fuel cell (not shown), carbon fiber papers 313 and 315 are replaced with carbon fiber cloth. Although carbon fiber cloth is more flexible and less fragile than carbon fiber paper, carbon fiber cloth suffers from the disadvantage that it is often drawn into grooves 325 and 327 of plates 321 and 323, respectively, thereby creating an obstruction therewithin. Still another alternative to carbon fiber paper of the type described above has been a carbon fiber paper that is formed without a binder. Although such a binder-less carbon fiber paper is more flexible than a binder-containing carbon fiber paper, the binder-less carbon fiber paper lacks resiliency when compressed and, therefore, does not provide adequate electrical contact.

Figure 20:
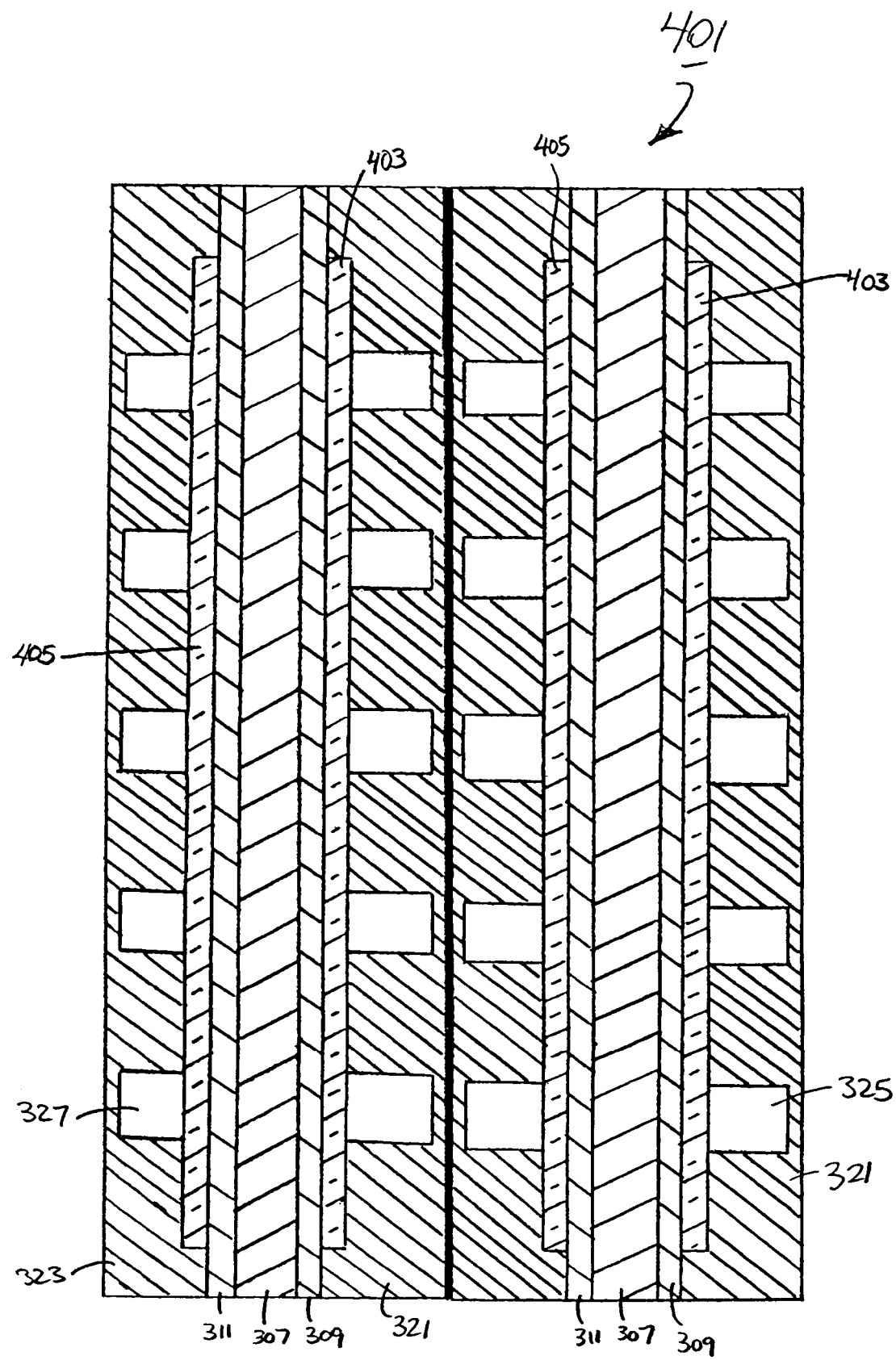
FIG. 20 is a schematic section view of a first embodiment of a PEM fuel cell stack constructed according to the teachings of the present invention.

Referring now to FIG. 20, there is shown a first embodiment of a PEM fuel cell stack constructed according to the teachings of the present invention, said PEM fuel cell stack being represented generally by reference numeral 401.

Stack 401 is similar in many respects to stack 301, the principal differences between the two stacks being that (i) stack 401 does not include a pad 305; and (ii) carbon fiber papers 313 and 315 of stack 301 are replaced with pads 403 and 405, respectively, in stack 401.

Pads 403 and 405 are similar in most respects to the second type of material discussed above as suitable for use as pad 105, one difference between the two being that pads 403 and 405 only have a thickness of about 10-15 mils. In addition, pad 405 preferably includes, in addition to its random mat of carbon fibers bound together using a thermoplastic binder, a waterproofing coating of PTFE and electron-conducting carbon particles, such as carbon black and/or graphite particles, applied to the cathode-facing side of the carbon fiber mat. (There may be some interpenetration of the waterproofing coating and the carbon fiber mat of pad 405.) The aforementioned waterproofing coating may alternatively be made by functionalizing electron-conducting carbon particles with hydrophobic organic groups. In such a case, a thermoplastic resin is preferably used as a binder.

One manner in which pad 405 may be manufactured is by wet-laying the carbon fiber and the waterproofing layers consecutively, followed by appropriate calendering. (This may even be done as part of a continuous manufacturing process.) Alternatively, one could lay down both layers in a single step. The calendering step primarily serves (i) to promote bonding between carbon fibers, between carbon fibers and electron-conducting carbon particles and between electron-conducting carbon particles by sintering the thermoplastic binder; (ii) to sinter PTFE so as to increase waterproofing if the presintering was carried out at temperatures higher than the melting temperature of PVDF but lower than that of PTFE; and (iii) to control thickness and porosity/density. The calendering step may use two (heated and cooled) calenders or more calenders may be used. Instead of calendering, appropriate thermal compression methods may be used.

The wet-laid process described above may be modified to simplify the process and/or to improve certain properties of the pad. For example, PTFE and PVDF may be added to the slurries of carbon fibers and carbon particles, thereby eliminating the pre-sintering step. Other non-woven technologies, such as a dry-laid process may be used.

EXAMPLE 8

A two-layer pad 405 was prepared by vacuum-casting water-slurries of the two carbon fiber mixtures listed below. The web was dried and pressed at 360° C. for 15 minutes. Its density and thickness were 0.3 g/cm$^3$ and 0.86 mm (35 mil), respectively. As expected, this pad was flexible and not easily fractured (unlike conventional binder-containing carbon fiber paper) and was less compressible than carbon fiber cloth and binder-less carbon fiber paper. Based on simple water drop tests, the PTFE-containing side of the pad was more hydrophobic than the other side.

Mixture 1: 3.0 g (67%) of Panex 33 (1 inch long) carbon fibers (Zoltek Companies, Inc, St. Louis, Mo.) and 1.5 g (33%) of Kynar 721 PVDF powder were blended in a coffee bean grinder, sintered at 200° C. for 5 minutes and then chopped in a Thomas-Wiley mill.

Mixture 2: 3.8 g of Panex 33 (1 inch long) carbon fibers and 1.9 g of Teflon MP1100 PTFE were blended in a coffee bean grinder and then sintered at 360° C. for 5 minutes. 3.9 g of this mixture was then combined with 1.5 g of Kynar 721 PVDF, sintered at 200° C. for 5 minutes and chopped in a Thomas-Wiley mill. The final composition was 48% carbon fiber/24% PTFE/28% PVDF.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A fuel cell comprising:
   (a) a proton exchange membrane, said proton exchange membrane having a first face and a second face;
   (b) an anode, said anode having an inner face and an outer face, said inner face of said anode being positioned along said first face of said proton exchange membrane and being electrically coupled thereto;
   (c) a cathode, said cathode having an inner face and an outer face, said inner face of said cathode being positioned along said second face of said proton exchange membrane and being electrically coupled thereto;
   (d) means for defining a porous anodic fluid cavity;
   (e) a compression pad for use in defining a cathodic fluid diffusion cavity, said compression pad being electrically-conductive, resiliently compressible and porous; and
   (f) means for containing fluid present within said compression pad.

2. The fuel cell as claimed in claim 1 wherein said compression pad comprises a mat of carbon fibers.

3. The fuel cell as claimed in claim 1 wherein said compression pad comprises a random mat of carbon fibers bound together using one or more binders.

4. The fuel cell as claimed in claim 3 wherein said one or more binders includes at least one thermoplastic binder.

5. The fuel cell as claimed in claim 4 wherein said at least one thermoplastic binder comprises a polyvinylidene fluoride (PVDF).

6. The fuel cell as claimed in claim 4 wherein said at least one thermoplastic binder comprises a combination of a PVDF and polytetrafluoroethylene (PTFE).

7. The fuel cell as claimed in claim 3 wherein said one or more binders includes a thermosetting binder.

8. The fuel cell as claimed in claim 3 wherein said compression pad further comprises a coating for modifying its wettability.

9. The fuel cell as claimed in claim 8 wherein said coating is applied to at least one side of said random mat and comprises PTFE.

10. The fuel cell as claimed in claim 9 wherein said coating further comprises electron-conducting carbon particles.

11. The fuel cell as claimed in claim 8 wherein said coating comprises electron-conducting carbon particles functionalized with hydrophobic organic groups.

12. The fuel cell as claimed in claim 1 wherein said compression pad comprises a stack of carbon fiber papers, each of said carbon fiber papers comprising a plurality of carbon fibers bound together with a first thermosetting binder, each of said carbon fiber papers being bound to an adjacent carbon fiber paper in said stack with a second thermosetting binder.

13. The fuel cell as claimed in claim 12 wherein said first thermosetting binder and said second thermosetting binder are the same.

14. The fuel cell as claimed in claim 1 wherein said compression pad has a density of about 0.2-1.5 g/cm$^3$.

15. The fuel cell as claimed in claim 14 wherein said compression pad has a density of about 0.35-0.77 g/cm$^3$.

16. The fuel cell as claimed in claim 15 wherein said compression pad has a density of about 0.55-0.77 g/cm$^3$.

17. The fuel cell as claimed in claim 1 wherein said compression pad, after being compressed to pressures up to about 12,000 psi, has an uncompressed thickness of at least 70% of its original, pre-compressed thickness.

18. The fuel cell as claimed in claim 1 wherein said means for containing fluid present within said compression pad comprises a bipolar separator plate.

19. The fuel cell as claimed in claim 1 wherein said compression pad has an inner face facing towards said cathode and an outer face facing away from said cathode, said fuel cell further comprising an electrically-conductive member applied to said outer face of said cathode and having a comparable size to said outer face of said cathode.

20. The fuel cell as claimed in claim 19 wherein said electrically-conductive member is one of a less porous member than said compression pad and a more porous member than said compression pad, said less porous member being fabricated from solid sheets of materials selected from the group consisting of carbon, titanium, zirconium and composites thereof in particulate or fiber form, together with a polymeric binder, said more porous member being selected from the group consisting of multiple meshes, etched metals, and sinters.

* * * * *